United States Patent
Korenaga et al.

(10) Patent No.: US 8,106,993 B2
(45) Date of Patent: Jan. 31, 2012

(54) DIFFRACTIVE IMAGING LENS, DIFFRACTIVE IMAGING LENS OPTICAL SYSTEM, AND IMAGING APPARATUS USING THE DIFFRACTIVE IMAGING LENS OPTICAL SYSTEM

(75) Inventors: Tsuguhiro Korenaga, Osaka (JP); Takamasa Ando, Osaka (JP); Masa-aki Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 444 days.

(21) Appl. No.: 12/300,732

(22) PCT Filed: May 11, 2007

(86) PCT No.: PCT/JP2007/059772
§ 371 (c)(1),
(2), (4) Date: Nov. 13, 2008

(87) PCT Pub. No.: WO2007/132787
PCT Pub. Date: Nov. 22, 2007

(65) Prior Publication Data
US 2009/0225215 A1 Sep. 10, 2009

(30) Foreign Application Priority Data
May 15, 2006 (JP) .................................. 2006-135577

(51) Int. Cl.
*G02B 13/16* (2006.01)
*G02B 5/18* (2006.01)
(52) U.S. Cl. ...................... 348/335; 359/569; 359/573
(58) Field of Classification Search .................. 348/335; 359/569, 573
See application file for complete search history.

(56) References Cited

U.S. PATENT DOCUMENTS

| | | | |
|---|---|---|---|
| 5,796,520 A * | 8/1998 | Maruyama | 359/565 |
| 6,137,535 A | 10/2000 | Meyers | |
| 6,441,956 B1 * | 8/2002 | Perlo et al. | 359/355 |
| 6,462,874 B1 * | 10/2002 | Soskind | 359/565 |
| 6,728,036 B2 * | 4/2004 | Kleemann et al. | 359/575 |
| 6,833,873 B1 | 12/2004 | Suda | |
| 7,149,030 B2 * | 12/2006 | Kleemann et al. | 359/575 |
| 7,715,302 B2 * | 5/2010 | Ohta et al. | 369/112.21 |
| 7,864,427 B2 * | 1/2011 | Korenaga et al. | 359/576 |
| 2003/0027967 A1 * | 2/2003 | Hori et al. | 528/10 |
| 2008/0004404 A1 * | 1/2008 | van de Grampel et al. | 525/439 |
| 2010/0134888 A1 * | 6/2010 | Korenaga et al. | 359/576 |
| 2011/0102898 A1 * | 5/2011 | Korenaga et al. | 359/570 |

FOREIGN PATENT DOCUMENTS

| | | |
|---|---|---|
| JP | 10-145802 | 5/1998 |
| JP | 10-300913 | 11/1998 |
| JP | 2001-78217 | 3/2001 |

* cited by examiner

*Primary Examiner* — Rodney Fuller
(74) *Attorney, Agent, or Firm* — Hamre, Schumann, Mueller & Larson, P.C.

(57) ABSTRACT

A diffractive imaging lens 10 includes a surface on which a diffraction grating pattern is formed. The diffraction grating pattern is formed of a plurality of steps formed concentrically with an optical axis (25) at a center. The diffraction grating pattern is formed such that a first portion where amounts (di) of the steps are substantially the same in a radial direction of concentric circles and a second portion, outside of the first portion, where amounts (di) of the steps decrease with distance from the optical axis 25 are provided, or such that the amounts (di) of the steps decrease with distance from the optical axis 25 over the entire diffraction grating pattern.

15 Claims, 14 Drawing Sheets

DIFFRACTIVE IMAGING LENS, DIFFRACTIVE IMAGING LENS OPTICAL SYSTEM, AND IMAGING APPARATUS USING THE DIFFRACTIVE IMAGING LENS OPTICAL SYSTEM

TECHNICAL FIELD

The present invention relates to a diffractive imaging lens provided with a diffraction grating pattern, a diffractive imaging lens optical system, and an imaging apparatus using the diffractive imaging lens optical system.

BACKGROUND ART

Camera modules for forming an image of a subject on a solid-state imaging device via a lens system are used widely for digital still cameras and mobile phone cameras. In recent years, camera modules have been required to have a larger number of pixels in combination with a lower profile. In general, as the number of pixels is increased, a lens system is required to have a higher resolution. Therefore, the thickness of a camera module tends to increase in the optical axis direction.

In this regard, when a pixel pitch of a solid-state imaging device is reduced, it is possible to reduce the imaging apparatus in size while keeping the same number of pixels. Based on this, an attempt has been made to enable the downsizing of a lens system and realize a camera module that combines a larger number of pixels with thinness. However, since the sensitivity and saturation power of a solid-state imaging device are in proportion to a pixel size, there is a limit to decreasing a pixel pitch.

Meanwhile, a compound-eye type camera module, which is a camera module having a plurality of units, each including a lens system and an imaging region on a solid-state imaging device, has been proposed to realize a reduction in thickness. For example, an exemplary compound-eye type camera module is proposed in Patent Document 1.

FIG. 13 is a view showing a configuration of a major portion of the compound-eye type camera module described in Patent Document 1. A lens array 132 includes three lenses 131a, 131b, and 131c. On the subject side of the respective lenses, a green spectral filter 133a, a red spectral filter 133b, and a blue spectral filter 133c are arranged.

A solid-state imaging device 134 includes therein three imaging regions for respectively forming images of a subject from the lenses. A green spectral filter 135a, a red spectral filter 135b, and a blue spectral filter 135c are provided also on the front surfaces of the respective imaging regions. With this configuration, it is possible to obtain a synthesized image by calculating signals obtained with respect to the respective units, each dealing with any one of green, red, and blue.

As compared with a camera module including only one pair of a lens system and a solid-state imaging device, a compound-eye type camera module as described above in which an equal-sized solid-state imaging device is divided into a plurality of imaging regions is capable of making an image smaller due to its individual divided imaging regions, so that a focal length of a lens system is reduced.

For example, in the case where a solid-state imaging device is divided into four equal portions lengthwise and crosswise, four lens systems are required. However, the focal length of the lens systems can be reduced to half, so that the thickness of a camera module can be reduced to half in the optical axis direction.

When each of the lens systems of the units is composed of a single lens rather than a plurality of combined lenses, it is possible to make a camera module thinner. However, when the lens system is composed of a single spherical lens, an aberration remains, which leads to insufficient resolution. For this reason, it is desirable to use at least an aspherical lens for the lens system.

Meanwhile, as a lens capable of achieving a still higher resolution than an aspherical lens, a diffractive lens is known that is provided with a concentric diffraction grating pattern on its aspherical lens surface. In addition to achieving a refraction effect of an aspherical lens, a diffractive lens can reduce various aberrations such as chromatic aberration significantly due to superimposed diffraction effects. When a diffractive lens with a diffraction grating pattern having a cross section in a blazed form or a fine-step-like form inscribed in a blaze is used, the diffractive lens is allowed to have a diffraction efficiency in a specific order of approximately 100% with respect to a single-wavelength light.

FIG. 14 is a view showing a conventional diffraction grating pattern. A diffraction grating pattern 142 is formed on a surface of a substrate 141 having a refractive index $n(\lambda)$. Theoretically, a depth d of the diffraction grating pattern such that an m-th-order diffraction efficiency with respect to a light beam 143 that has a wavelength $\lambda$ and is incident on the diffraction grating pattern 142 is 100% is given as the following formula.

$$d = m\lambda/(n(\lambda)-1) \qquad \text{Formula (1)}$$

where the refractive index $n(\lambda)$ is a function of the wavelength.

According to Formula (1), the value of d that gives an m-th-order diffraction efficiency of 100% varies as the wavelength $\lambda$ varies. Although the following description is directed to the case of a 1st-order diffraction efficiency where m is 1, m is not limited to 1.

FIG. 15 is a diagram showing wavelength dependence of a 1st-order diffraction efficiency of a conventional diffraction grating. The figure shows a 1st-order diffraction efficiency with respect to a light beam that is incident on a diffraction grating pattern vertically. The diffraction grating pattern is formed on a cycloolefin-based resin of ZEONEX (produced by Zeon Corporation) and has a depth of 0.95 μm. The depth d of the diffraction grating pattern is designed with respect to a wavelength of 500 nm according to Formula (1). Therefore, the diffraction efficiency for 1st-order diffracted light is approximately 100% at a wavelength of 500 nm.

However, the 1st-order diffraction efficiency is about 75% at wavelengths of 400 nm and 700 nm due to its wavelength dependence. A decrease of 1st-order diffraction efficiency from 100% causes unnecessary diffracted light such as 0th-order, 2nd-order, and −1st order diffracted light.

In this manner, when a single diffractive lens is used over an entire visible light range (wavelengths of 400 to 700 nm), unnecessary diffracted light is likely to be generated. On the other hand, when the three lenses 131a, 131b, and 131c shown in FIG. 13 are used, a wavelength width of light to be handled by each of the lenses may be about 100 nm.

As shown in FIG. 15, at wavelengths of 450 to 550 nm, the 1st-order diffraction efficiency is about 95% or more, reaching its peak at a center wavelength of 500 nm, and unnecessary diffracted light is less likely to be generated. On this account, when a diffraction grating is used for each of the three lenses 131a, 131b, and 131c in FIG. 13, a depth d of the diffraction grating pattern may be adjusted as appropriate in accordance with the wavelength of green, red, or blue light according to Formula 1.

It is very effective to use a diffractive lens as a lens of a compound-eye type camera module in obtaining a high-resolution image. Hereinafter, a diffractive lens to be used mainly for imaging is referred to specifically as a diffractive imaging lens.

However, when a wide-angle image is captured, light from a subject is incident at a large angle with respect to an optical axis of a lens. According to the study by the present inventors, when a wide-angle image is captured by using the conventional diffractive imaging lens as described above, the image has a lower contrast.

FIG. 16 is a view showing a location of a light beam incident on a conventional diffraction grating. A substrate 161 is made of ZEONEX as described above, and a depth d of a diffraction grating pattern 162 is 0.95 μm, which is designed with respect to a wavelength of 500 nm according to Formula (1). An incident angle θ indicates an angle at which a light beam is incident on the diffraction grating pattern 162. FIGS. 17A to 17D show the wavelength dependence of a 1st-order diffraction efficiency in the diffraction grating in FIG. 16 with the incident angle θ being a parameter. FIGS. 17A, 17B, 17C, and 17D show wavelength dependence of a 1st-order diffraction efficiency in the cases where light is incident vertically, where θ is 10°, where θ is 20°, and where θ is 30°, respectively.

FIGS. 17A to 17D show that as the incident angle θ becomes larger, the wavelength at which the 1st-order diffraction efficiency is maximum is shifted to the long wavelength side. When considering light having a wavelength of 500 nm, when the depth d of the diffraction grating pattern is designed with respect to a wavelength of 500 nm according to Formula (1), a 1st-order diffraction efficiency of approximately 100% can be achieved if the light is incident vertically. However, when the incident angle θ varies to 10°, 20°, and 30°, the 1st-order diffraction efficiency decreases to 99.8%, 98.3%, and 91.5%, respectively. Namely, when it is attempted to obtain a wide-angle image, unnecessary diffracted light is generated, resulting in a decrease in resolution.

On the other hand, as can be seen from FIGS. 17A to 17D, at a wavelength of about 540 nm, the 1st-order diffraction efficiency is 98% or more even when the incident angle θ varies, and a decrease in 1st-order diffraction efficiency with an increase in incident angle θ is suppressed.

In view of the above, the depth d of the diffraction grating pattern is calculated and designed with respect to a wavelength λ that is set to be shorter than the wavelength to be used actually according to Formula (1). In other words, the depth of the diffraction grating pattern is made smaller than that to be calculated from the wavelength to be used actually. Consequently, with respect to a limited narrow wavelength range, a 1st-order diffraction efficiency of approximately 100% can be achieved irrespective of the incident angle as long as it is in a range of about 30°. The dependence of the diffraction efficiency on the incident angle as described above is seen not only when the diffraction grating pattern is formed on the flat plate as shown in FIG. 16 but also when it is formed on a spherical or aspherical lens.

As described above, in order to obtain a wide-angle image by using the conventional diffractive imaging lens, it is necessary to limit the wavelength width of light to be incident on the diffractive imaging lens to about 20 to 30 nm by allowing the light to pass through a filter having a narrow transmission wavelength band or the like. Accordingly, an amount of light received by a solid-state imaging device is decreased, and the S/N ratio is degraded. As a result, image quality is degraded particularly under dim lighting conditions.

Patent Document 1: JP 2001-78217 A

DISCLOSURE OF INVENTION

The present invention has been conceived to solve the conventional problems as described above, and it is an object thereof to provide a diffractive imaging lens, a diffractive imaging lens optical system, and an imaging apparatus using the diffractive imaging lens optical system capable of obtaining a wide-angle and high-resolution image by reducing unnecessary diffracted light.

In order to achieve the above-described object, a diffractive imaging lens according to the present invention includes a surface on which a diffraction grating pattern is formed. The diffraction grating pattern is formed of a plurality of steps formed concentrically with an optical axis at a center. The diffraction grating pattern is formed with a first portion where amounts of the steps are substantially the same in a radial direction of concentric circles and a second portion, outside of the first portion, where amounts of the steps decrease with distance from the optical axis, or such that the amounts of the steps decrease with distance from the optical axis over the entire diffraction grating pattern.

A diffractive imaging lens optical system according to the present invention includes: a diaphragm; and a diffractive imaging lens that forms an image of a subject via the diaphragm. The diffractive imaging lens includes a surface on which a diffraction grating pattern is formed, and the diffraction grating pattern is formed of a plurality of steps formed concentrically with an optical axis at a center. Assuming that ri (i is an integer of 1 or more) is an i-th radius from an optical axis side among radiuses of concentric circles corresponding to the respective steps, di (i is an integer of 1 or more) is an amount of a step corresponding to ri, and R is a distance between the optical axis and a point where a light beam incident on the diffractive imaging lens in parallel with and farthest from the optical axis crosses the diffraction grating pattern, when, among ri, rk is a maximum radius that is not larger than R, in the case where k≧2 is satisfied, the amounts d1 to dk of the steps are substantially the same, and amounts of the steps provided outside of a step corresponding to rk decrease with distance from the optical axis, and in the case where k=1 or r1>R is satisfied, the amounts of the steps decrease with distance from the optical axis over the entire diffraction grating pattern.

An imaging apparatus according to the present invention includes: the diffractive imaging lens optical system as described above; a solid-state imaging device that receives light from a subject that has passed through the optical system; and an arithmetic circuit for generating an image of the subject based on an electric signal detected by the solid-state imaging device.

DESCRIPTION OF THE INVENTION

According to the diffractive imaging lens and the diffractive imaging lens optical system of the present invention, the amounts of the steps of the diffraction grating pattern are not uniform, but have a distribution. Therefore, unnecessary diffracted light is reduced, and a wide-angle and high-resolution image can be obtained. Further, since the imaging apparatus using the diffractive imaging lens of the present invention is capable of achieving a wide-angle and high-resolution image with a single lens, it can be thinned and downsized.

In the diffractive imaging lens and the diffractive imaging lens optical system of the present invention, it is preferable that the diffraction grating pattern is covered with a protective film made of a material different from a material of the diffraction grating pattern. With this configuration, the wavelength dependence of a diffraction efficiency can be suppressed, thereby maintaining a high diffraction efficiency over a wider wavelength range.

It is preferable that the protective film is formed on a subject-side surface of the diffractive imaging lens. With this configuration, an incident angle of a light beam incident on an image-formation-side surface of the diffractive imaging lens can be reduced, so that unnecessary diffracted light can be reduced more advantageously.

It is preferable that the diffraction grating pattern and the protective film are made of a resin, and either the diffraction grating pattern or the protective film is made of a mixed material of a resin and inorganic particles.

It is preferable that the protective film is made of a material obtained by dispersing particles of any one or more of zirconium oxide, yttrium oxide, and aluminum oxide in a photocurable resin.

Further, it is preferable that the imaging apparatus further includes an image comparing and processing circuit, that a plurality of units, each including the optical system and the solid-state imaging device, are provided, and that the image comparing and processing circuit compares the electric signals detected by the solid-state imaging devices corresponding to the respective units, thereby calculating distance information of the subject. Since the imaging apparatus with this configuration uses the diffractive imaging lens according to the present invention, it is possible to obtain high-resolution and high-accuracy distance information of the subject.

Hereinafter, embodiments of the present invention will be described with reference to the drawings. Also in the following description, a diffractive lens to be used mainly for imaging is referred to as a diffractive imaging lens.

Embodiment 1

Figure 1:
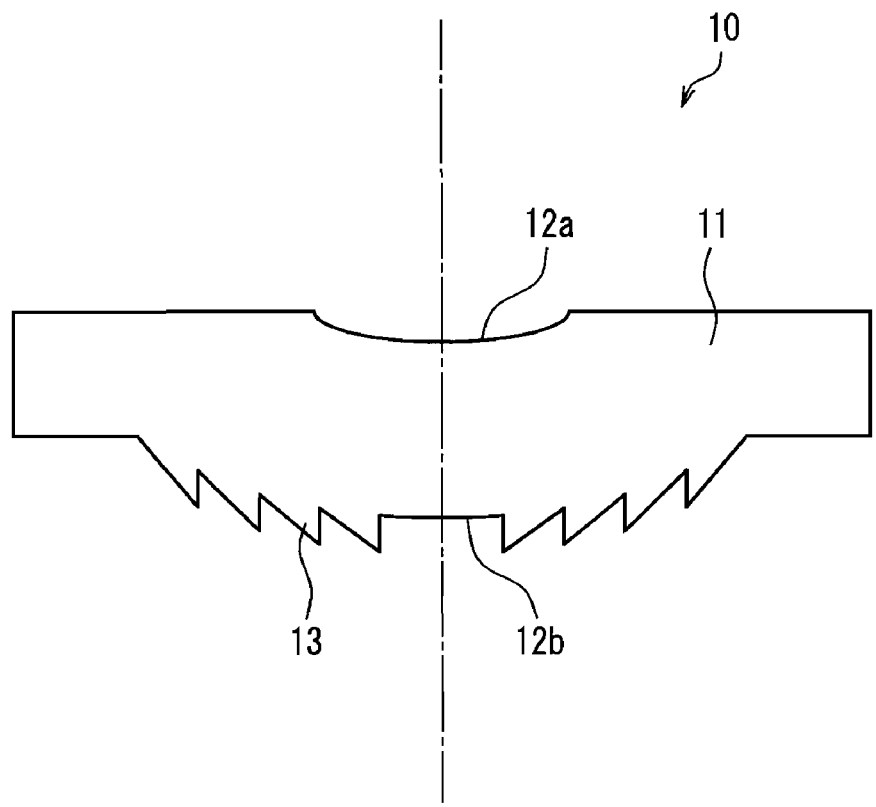
FIG. 1 is a cross-sectional view of a diffractive imaging lens according to Embodiment 1 of the present invention.

FIG. 1 is a cross-sectional view of a diffractive imaging lens according to the present embodiment. A diffractive imaging lens 10 is a single lens. A first surface 12a of a substrate 11 of the lens is aspherical. A second surface 12b opposed thereto is an aspherical surface on which a ring-shaped diffraction grating pattern 13 is formed. The first surface and the second surface refer to a surface on the subject side and a surface on the image formation side, respectively, of both surfaces of the lens. Respective ring pitches of the diffraction grating pattern 13 are arranged at irregular intervals. In the figure, steps of the diffraction grating pattern and the shape of the lens are shown schematically in favor of visibility.

The substrate 11 is made of ZEONEX480R (with a d-line refractive index of 1.5247 and an Abbe number of 56.2) produced by Zeon Corporation. The lens has a thickness of 0.65 mm on an optical axis.

Table 1 below shows aspherical coefficients of the first surface and aspherical coefficients and phase coefficients of the second surface of the diffractive imaging lens according to the present embodiment.

TABLE 1

| First surface | | Second surface | | | |
|---|---|---|---|---|---|
| Aspherical coefficient | | Aspherical coefficient | | Phase coefficient | |
| Radius of curvature r (mm) | −1.80 | Radius of curvature r (mm) | −0.89 | 1st-order | 0 |
| | | | | 2nd-order | 8.33 × 10⁻² |
| | | | | 3rd-order | 0 |
| Conic constant k | 0 | Conic constant k | 0 | 4th-order | −5.79 × 10⁻⁴ |
| | | | | 5th-order | 0 |
| 4th-order | −0.53 | 4th-order | −0.11 | 6th-order | 8.04 × 10⁻⁶ |
| 6th-order | −5.53 | 6th-order | −0.14 | 7th-order | 0 |
| 8th-order | 54.21 | 8th-order | −0.86 | 8th-order | −1.40 × 10⁻⁷ |
| 10th-order | 0 | 10th-order | 0 | 9th-order | 0 |
| 12th-order | 0 | 12th-order | 0 | 10th-order | 2.69 × 10⁻¹⁶ |
| | | | | 11th-order | 0 |
| | | | | 12th-order | 0 |

The diffraction grating pattern can be expressed by a phase polynomial. In the case of the diffraction grating symmetric with respect to the optical axis as in the present embodiment, a phase amount required for diffraction can be expressed by a polynomial of a distance r from the optical axis. Assuming that a diffraction order is m, the phase polynomial can be converted into the diffraction grating pattern by providing steps at intervals of 2 mπ. The diffraction grating pattern on the second surface of the diffractive imaging lens according to the present embodiment is designed so that an appropriate image can be formed when m is 1, i.e., by using 1st-order diffracted light.

Figure 2:
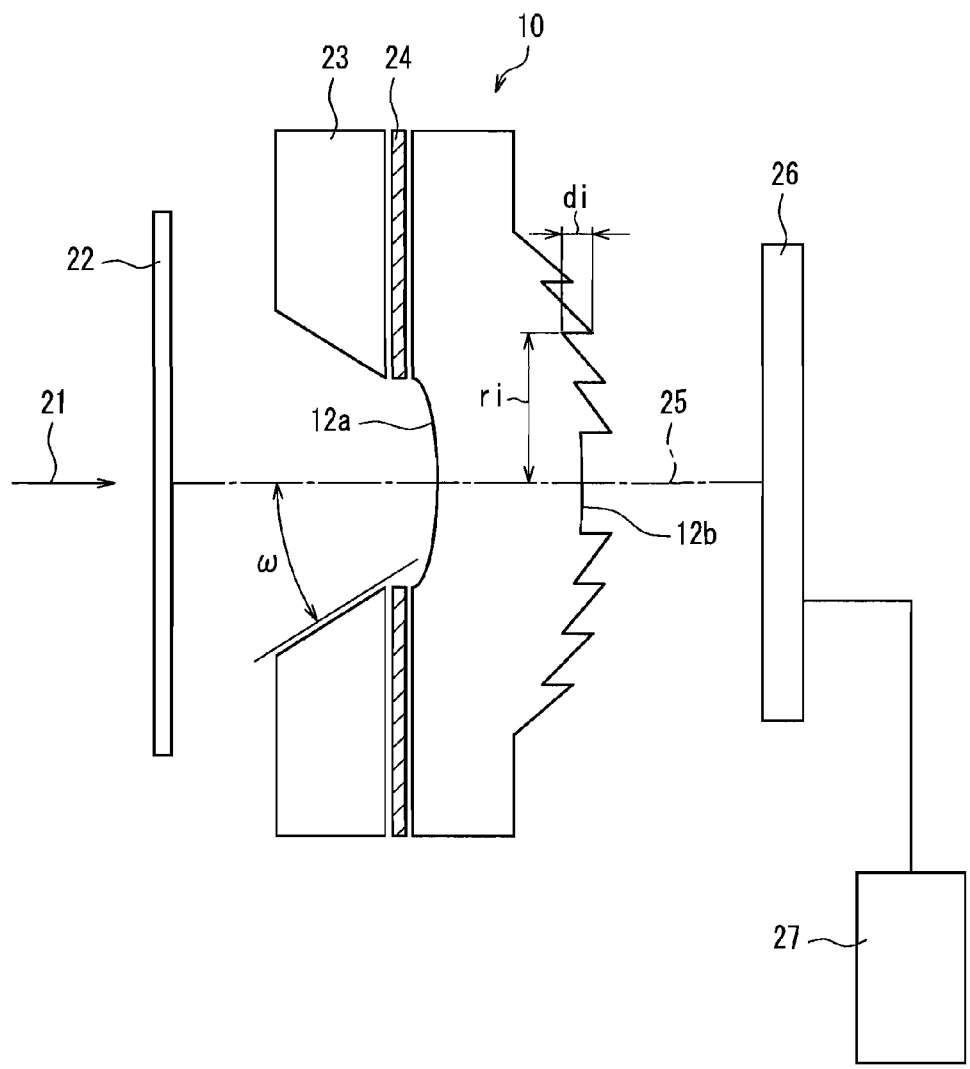
FIG. 2 is a view showing a configuration of an imaging apparatus according to Embodiment 1 of the present invention.

FIG. 2 shows an imaging apparatus using the diffractive imaging lens 10 according to the present embodiment. In the configuration shown in FIG. 2, the diffractive imaging lens 10 is used as a component of a diffractive imaging lens optical system. More specifically, the diffractive imaging lens 10 as well as a color filter 22, a hood 23, and a diaphragm 24 configure the diffractive imaging lens optical system.

Among light 21 from a subject (not shown), only light having wavelengths of 500 to 600 nm is allowed to pass through the color filter 22, and travels through the hood 23 to the diaphragm 24. The hood 23 is designed so as to prevent light from entering the optical system at a half angle of view ω (angle that the light forms with an optical axis 25) or larger. In the example in FIG. 2, ω is 30°.

The diaphragm 24 is provided so that the optical axis 25 passes through its center. Light that has traveled through the diaphragm 24 passes through the first surface 12a and the second surface 12b of the diffractive imaging lens 10 to be incident on a solid-state imaging device 26. Information detected by the solid-state imaging device 26 is processed by an arithmetic circuit 27. After the processing, an image of the subject is displayed by an appropriate display means connected to the arithmetic circuit 27. In the present embodiment, the diaphragm 24 has a diameter of 0.45 mm, a focal length of 1.8 mm, and an F number of 4.

Figure 3:
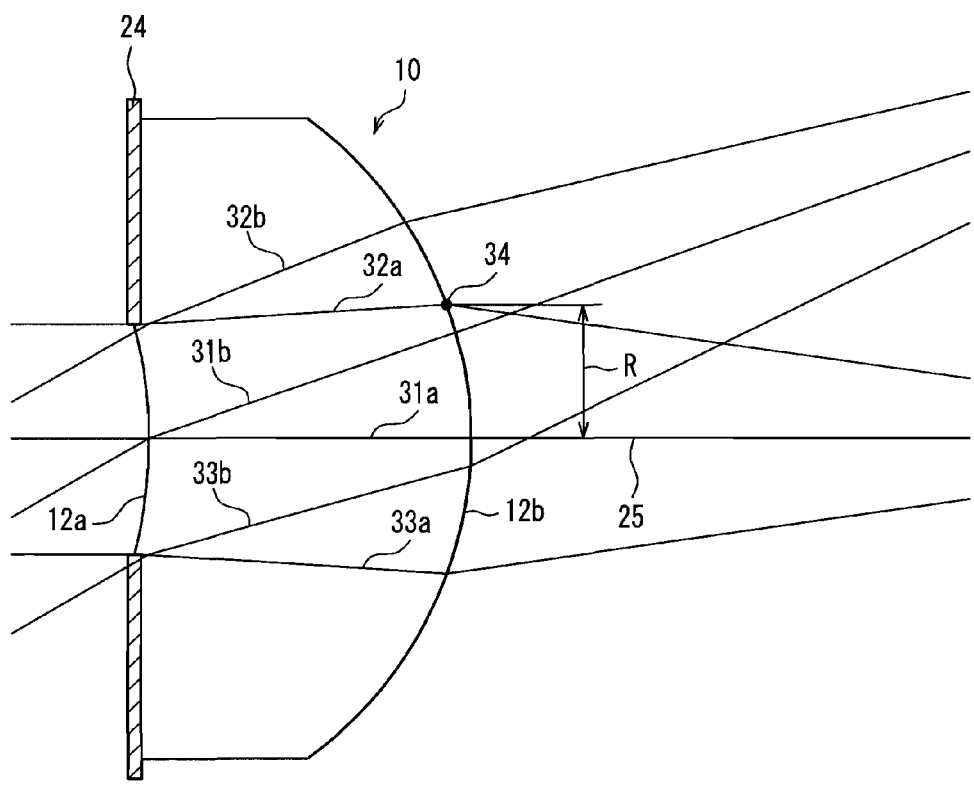
FIG. 3 is a view showing paths of light beams in the respective cases where a half angle of view is 0° and 30° in a diffractive imaging lens optical system according to Embodiment 1 of the present invention.

FIG. 3 shows paths of light beams in the respective cases where the half angle of view is 0° and 30° in the diffractive imaging lens 10. The light beams from the subject that travel through the diaphragm 24 to be incident on the lens in parallel with the optical axis (at a half angle of view ω of 0°) have a principal ray 31a. In the case where ω is 0°, a light beam passing through an upper end of the diaphragm 24 is a light beam 32a, and a light beam passing through a lower end of the diaphragm 24 is a light beam 33a. Similarly, the light beams that are incident on the lens at an angle of 30° with respect to the optical axis (at a half angle of view ω of 30°) have a principal ray 31b. In the case where ω is 30°, a light beam passing through the upper end of the diaphragm 24 is a light beam 32b, and a light beam passing through the lower end of the diaphragm 24 is a light beam 33b.

In FIG. 3, the diffraction grating pattern on the second surface 12b is not shown. The principal ray refers to a light beam that passes through the center of the diaphragm to be incident on the optical system. The principal ray is determined uniquely when the half angle of view ω is specified.

As can be seen from FIG. 3, the light beams pass through the second surface 12b only at large half angles of view ω in a portion far from the optical axis 25, and the light beams pass at any half angles of view ω within a range of 0° to 30° in a portion close to the optical axis 25.

The diffraction grating pattern (FIG. 2) formed on the second surface 12b has a distribution of a phase amount symmetrically with respect to and in parallel with the optical axis 25. Thus, the angle of incidence on the diffraction grating pattern, which is taken as a parameter in FIGS. 17A to 17D, is an angle formed between the light beam incident on the second surface 12b and the optical axis 25.

As can be seen from FIG. 3, even the light beams incident at the same half angle of view ω are incident on the diffraction grating pattern at different angles because they are refracted by the first surface 12a at different angles depending on where the light passes through the diaphragm 24.

Table 2 below shows exemplary numerical values of the diffractive imaging lens 10.

TABLE 2

| Ring number | Radius (mm) ri of concentric circle | Minimum incident angle θ min (DEG) | Half angle of view ω (DEG) of minimum incident light beam | Maximum incident angle θ max (DEG) | Half angle of view ω (DEG) of maximum incident light beam |
|---|---|---|---|---|---|
| 1 | r1 0.081 | 1 | 0 | 17 | 30 |
| 2 | r2 0.115 | 1 | 0 | 17 | 30 |
| 3 | r3 0.141 | 1 | 0 | 17 | 30 |
| 4 | r4 0.162 | 1 | 0 | 17 | 30 |
| 5 | r5 0.182 | 1 | 0 | 18 | 30 |
| 6 | r6 0.199 | 2 | 0 | 18 | 30 |
| 7 | r7 0.215 | 2 | 0 | 19 | 30 |
| 8 | r8 0.230 | 2 | 0 | 19 | 30 |
| 9 | r9 0.244 | 3 | 0 | 19 | 30 |
| 10 | r10 0.257 | 3 | 0 | 20 | 30 |
| 11 | r11 0.270 | 4 | 2 | 20 | 30 |
| 12 | r12 0.282 | 5 | 3 | 20 | 30 |
| 13 | r13 0.293 | 6 | 5 | 21 | 30 |
| 14 | r14 0.304 | 7 | 7 | 21 | 30 |
| 15 | r15 0.315 | 8 | 9 | 21 | 30 |
| 16 | r16 0.325 | 10 | 10 | 21 | 30 |
| 17 | r17 0.335 | 10 | 12 | 21 | 30 |
| 18 | r18 0.345 | 11 | 13 | 22 | 30 |
| 19 | r19 0.354 | 12 | 15 | 22 | 30 |
| 20 | r20 0.363 | 13 | 16 | 22 | 30 |
| 21 | r21 0.372 | 14 | 18 | 22 | 30 |
| 22 | r22 0.381 | 15 | 19 | 22 | 30 |
| 23 | r23 0.390 | 16 | 21 | 22 | 30 |
| 24 | r24 0.398 | 17 | 22 | 22 | 30 |
| 25 | r25 0.406 | 18 | 24 | 22 | 30 |
| 26 | r26 0.414 | 19 | 25 | 22 | 30 |
| 27 | r27 0.422 | 20 | 27 | 22 | 30 |
| 28 | r28 0.430 | 21 | 28 | 22 | 30 |
| 29 | r29 0.438 | 22 | 30 | 22 | 30 |

In Table 2, the ring numbers refer to numbers assigned from the optical axis 25 side sequentially to steps of concentric diffraction rings with the optical axis at the center in the diffractive imaging lens 10. Further, ri (i is an integer of 1 or more) represents a radius of the ring step corresponding to each of the ring numbers. In other words, ri represents a radius of the i-th diffraction ring step from the optical axis 25 side. Furthermore, θmin represents a minimum incident angle of a group of light beams passing through each of the ring steps, and θmax represents a maximum incident angle of the group of light beams passing through each of the ring steps. Table 2 also shows half angles of view of the light beams corresponding to θmin and θmax, respectively. There are 29 diffraction ring steps, which are coarser in the vicinity of the center of the lens surface, i.e., the optical axis, and become finer toward the periphery.

In FIG. 3, it is assumed that R is a distance between the optical axis 25 and a point 34 where the light beam incident on the diffractive imaging lens 10 in parallel with and farthest from the optical axis 25 crosses the diffraction grating pattern. More specifically, the light beam crossing at the point 34 is a light beam that has been incident on the first surface 12a at a half angle of view of 0° and passed through the upper end of the diaphragm 24. In the example shown in Table 2, R is 0.259 mm.

As shown in Table 2, with respect to the ring numbers 1 to 10, the light beams are incident at a half angle of view of 0°. With respect to the ring numbers from 11 onward, the light beams are incident and pass only at half angles of view larger than 0°, which increase with distance from the optical axis 25.

In other words, with the point 34 (FIG. 3) where the light beam 32a passing through the upper end of the diaphragm 24 crosses the diffraction grating pattern as a boundary, a breakdown of the half angles of view of the incident light beams varies. Assuming that k is a maximum ring number with respect to which the radius ri is not larger than R, which is 0.259 mm as described above, k is 10 in the example shown in Table 2. Namely, among ri, r10, which is 0.257 mm, is a maximum radius that is not larger than R of 0.259 mm.

When considering a planar subject that is vertical to the optical axis and has uniform brightness, an amount of luminous flux incident on an entrance pupil of the lens is proportional to the fourth power of cos ω with respect to the half angle of view ω. Namely, the light beams incident at larger half angles of view contribute less to an image. With respect to the region corresponding to the ring numbers 1 to 10 as described above, the light beams incident at smaller half angles of view contribute more. On this account, it is ensured that the 1st-order diffraction efficiency is maximum with respect to a light beam incident at an angle close to that of vertical incidence, and amounts of the ring steps (depths of the diffraction grating pattern) are made equal.

On the other hand, with respect to the ring numbers 11 to 29 on an outer periphery thereof, the half angle of view of the minimum incident light beam is larger with respect to an outer peripheral step, as can be seen from Table 2. Because of this, it is ensured that amounts of the steps decrease with distance from the optical distance.

This will be described more specifically. Assuming that $n(\lambda)$ is a refractive index at a wavelength $\lambda$, a step amount d such that an m-th-order diffraction efficiency is 100% is given as Formula (2) below.

$$d = m\lambda/(n(\lambda)-1) \qquad \text{Formula (2)}$$

Figure 16:
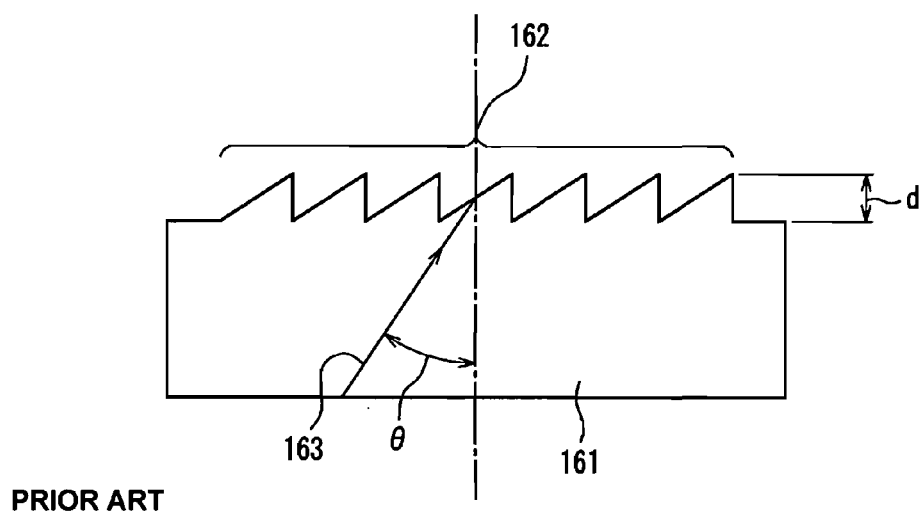
FIG. 16 is a view showing an exemplary location of a light beam incident on a conventional diffraction grating.
Figure 17A:
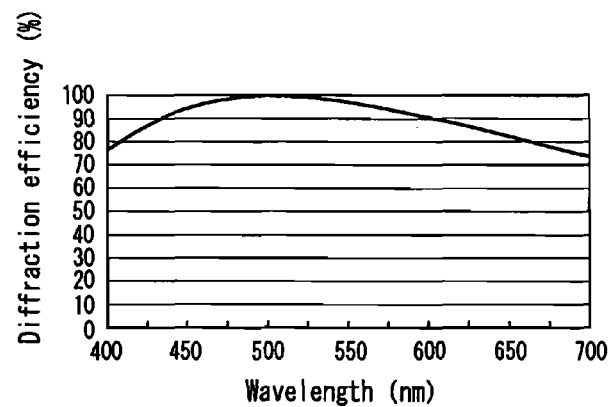
FIGS. 17A to 17D are diagrams showing exemplary wavelength dependence of a 1st-order diffraction efficiency in the conventional diffraction grating with an incident angle being a parameter.
Figure 17B:
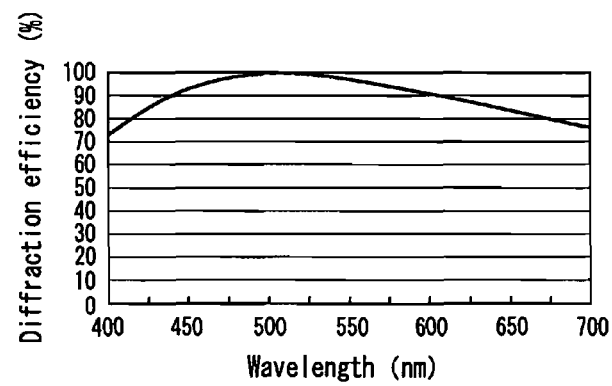
Figure 17C:
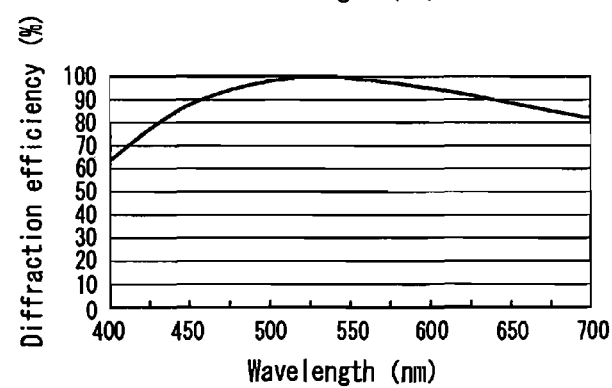
Figure 17D:
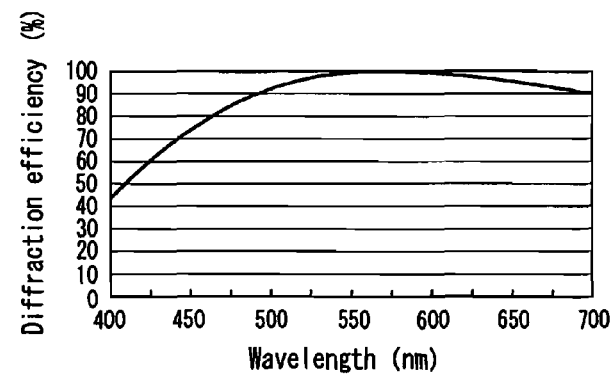

This formula is the same as Formula (1) above. As described above, when the step amount d is designed according to Formula (2), a 1st-order diffraction efficiency of approximately 100% can be achieved if the light is incident vertically. However, the 1st-order diffraction efficiency is degraded in accordance with the incident angle θ (see FIG. 16).

As described above, the incident angle θ in FIGS. 17A to 17D becomes larger in this order. As can be seen from FIGS. 17A to 17D, as the incident angle θ becomes larger, the wavelength at which the 1st-order diffraction efficiency is maximum also becomes larger. In view of this, when the depth d is designed with respect to a wavelength λ that is set to be shorter than a center wavelength of use wavelengths, a 1st-order diffraction efficiency of approximately 100% can be achieved at the center wavelength of the use wavelengths if the incident angle θ is 30°, for example, although it is degraded if the light is incident vertically.

As described above, as the incident angle θ becomes larger, the wavelength at which the 1st-order diffraction efficiency is maximum also becomes larger. Thus, in order to achieve a maximum 1st-order diffraction efficiency with respect to the incident angle θ, the wavelength λ should be set to be shorter in Formula (2) when the incident angle θ is larger. Meanwhile, when the wavelength λ is set to be shorter, the step amount d obtained by Formula (2) becomes smaller.

Consequently, when the step amount d is smaller, the incident angle θ with respect to which the 1st-order diffraction efficiency is maximum is larger at the same use wavelengths. Thus, the step amounts are made smaller in a portion where a higher proportion of light beams are incident at large incident angles θ, thereby suppressing degradation of the 1st-order diffraction efficiency.

For example, when d obtained by Formula (2) is multiplied by a correction coefficient that decreases with increasing incident angle θ, a distribution of the step amounts d can be set. In the following example, Formula (3) is used as an exemplary correction coefficient.

Table 3 below shows exemplary numerical values of the amounts of the diffraction ring steps in the diffractive imaging lens shown in Table 2.

TABLE 3

| Ring number | Radius (mm) ri of concentric circle | Minimum incident angle θ min (DEG) | Maximum incident angle θ max (DEG) | Correction coefficient β | Step amount (μm) di | |
|---|---|---|---|---|---|---|
| 1 | r1 0.081 | 1 | 17 | 0.982 | d1 | 1.025 |
| 2 | r2 0.115 | 1 | 17 | 0.982 | d2 | 1.025 |
| 3 | r3 0.141 | 1 | 17 | 0.982 | d3 | 1.025 |
| 4 | r4 0.162 | 1 | 17 | 0.982 | d4 | 1.025 |
| 5 | r5 0.182 | 1 | 18 | 0.982 | d5 | 1.025 |
| 6 | r6 0.199 | 2 | 18 | 0.982 | d6 | 1.025 |
| 7 | r7 0.215 | 2 | 19 | 0.982 | d7 | 1.025 |
| 8 | r8 0.230 | 2 | 19 | 0.982 | d8 | 1.025 |
| 9 | r9 0.244 | 3 | 19 | 0.982 | d9 | 1.025 |
| 10 | r10 0.257 | 3 | 20 | 0.982 | d10 | 1.025 |
| 11 | r11 0.270 | 4 | 20 | 0.977 | d11 | 1.020 |
| 12 | r12 0.282 | 5 | 20 | 0.976 | d12 | 1.019 |
| 13 | r13 0.293 | 6 | 21 | 0.973 | d13 | 1.016 |
| 14 | r14 0.304 | 7 | 21 | 0.971 | d14 | 1.014 |
| 15 | r15 0.315 | 8 | 21 | 0.970 | d15 | 1.013 |
| 16 | r16 0.325 | 10 | 21 | 0.966 | d16 | 1.009 |
| 17 | r17 0.335 | 10 | 21 | 0.966 | d17 | 1.009 |
| 18 | r18 0.345 | 11 | 22 | 0.962 | d18 | 1.005 |
| 19 | r19 0.354 | 12 | 22 | 0.960 | d19 | 1.002 |
| 20 | r20 0.363 | 13 | 22 | 0.957 | d20 | 1.000 |
| 21 | r21 0.372 | 14 | 22 | 0.955 | d21 | 0.997 |
| 22 | r22 0.381 | 15 | 22 | 0.952 | d22 | 0.994 |
| 23 | r23 0.390 | 16 | 22 | 0.949 | d23 | 0.991 |
| 24 | r24 0.398 | 17 | 22 | 0.946 | d24 | 0.988 |
| 25 | r25 0.406 | 18 | 22 | 0.942 | d25 | 0.984 |
| 26 | r26 0.414 | 19 | 22 | 0.939 | d26 | 0.980 |
| 27 | r27 0.422 | 20 | 22 | 0.935 | d27 | 0.977 |
| 28 | r28 0.430 | 21 | 22 | 0.931 | d28 | 0.972 |
| 29 | r29 0.438 | 22 | 22 | 0.927 | d29 | 0.968 |

The step amount di (i is an integer of 1 or more) in Table 3 is an amount of a step corresponding to a position of the radius ri. In other words, di represents an amount of a step at a position of the i-th radius ri from the optical axis 25 side. FIG. 2 shows the relationship between the radius ri and the step amount di.

The step amounts d1 to d29 can be obtained by multiplying d obtained by Formula (2) above by the correction coefficient β obtained by Formula (3) below.

In Formula (2), λ is 550 nm, which is a center wavelength of a use wavelength band of 500 to 600 nm, the refractive index $n(\lambda)$ is 1.5267, and the diffraction order m is 1. The correction coefficient β in Table 3 is obtained from Formula (3) below, considering that $(\cos 0°)^4$ is 1 and $(\cos 30°)^4$ is 0.56.

$$\beta = (\cos \theta min + 0.56 \cos \theta max)/1.56 \qquad \text{Formula (3)}$$

First, with respect to the ring numbers 1 to 10, assuming that an average value of the minimum incident angle θmin and an average value of the maximum incident angle θmax with respect to the ring numbers 1 to 10 in Table 2 are 2° and 18°, respectively, β is 0.982 according to Formula (3).

With respect to the ring numbers 11 to 29, the minimum incident angle θmin and the maximum incident angle θmax corresponding to each of the ring numbers in Table 2 are substituted into Formula (3), thereby obtaining β in Table 3.

Namely, the amounts d1 to d10 of the steps corresponding to the ring numbers 1 to 10 where the light beam is incident at a half angle of view of 0° are constant. On the other hand, the amounts of the steps corresponding to the ring numbers 11 to 29 decrease with increasing number.

As described above, the step amount is set in accordance with the incident angle θ so as to suppress degradation of the 1st-order diffraction efficiency in the present example. Thus, the numerical values may be changed as appropriate within a range that satisfies a desired reference value of the 1st-order diffraction efficiency. For example, although d1 to d10 are constant in the present example, these values may vary to the extent that they can be regarded as constant.

Similarly, the numerical values of the amounts of the steps corresponding to the ring numbers 11 to 29 also may be changed as appropriate to the extent that they can be regarded as decreasing with increasing number. For example, the step amounts may be the same, or alternatively the magnitude relationship of the step amounts may be reversed in a minute portion. In the present example, with respect to the ring numbers 11 to 29, the amounts of some of the adjacent steps may be the same, which, however, is seen only in a minute portion. Thus, the step amounts, as a whole, can be regarded as decreasing with distance from the optical axis.

Further, the diffraction grating pattern is designed so that the steps are connected smoothly in accordance with the correction coefficients β. In this manner, the shape of the second surface in the diffractive imaging lens of the present embodiment is determined.

As described above, in the diffractive imaging lens of the present embodiment, the amounts of the steps of the diffraction grating pattern are not uniform, but have a distribution in accordance with the light incident on the diffraction grating pattern as shown in Table 3. Therefore, it is possible to achieve a 1st-order diffraction efficiency of approximately 100% with respect to all light beams incident at a small half angle of view to a large half angle of view of 30°. Namely, according to the present embodiment, it is possible to realize a wide-angle and high-resolution diffractive imaging lens that can reduce unnecessary diffracted light.

Figure 15:
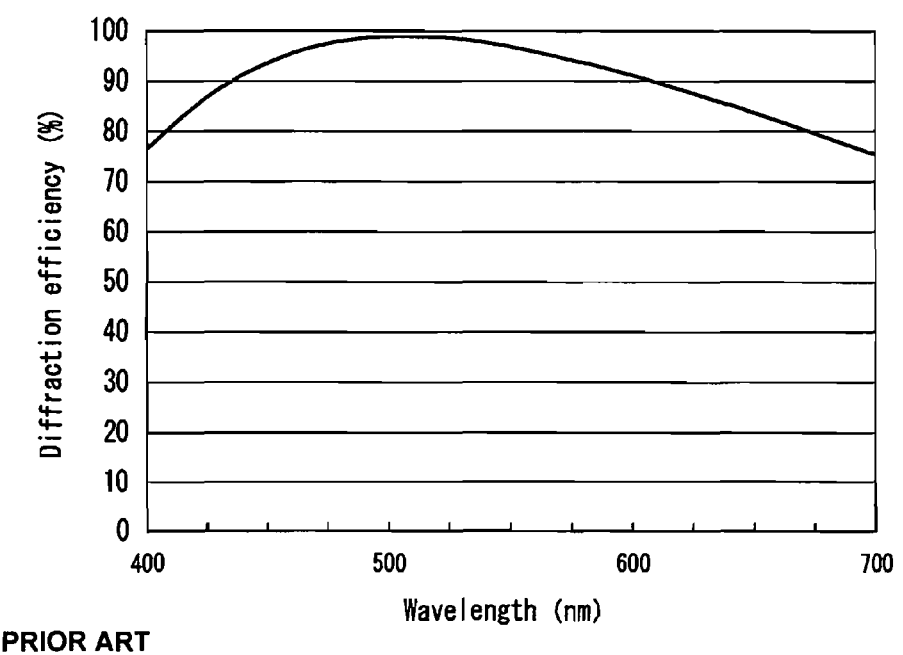
FIG. 15 is a diagram showing exemplary wavelength dependence of a 1st-order diffraction efficiency of a conventional diffraction grating.

As described above, in the example shown in FIGS. 17A to 17D, the 1st-order diffraction efficiency decreases with increasing incident angle at a center wavelength of 500 nm. In the example in FIGS. 17A to 17D, a 1st-order diffraction efficiency of approximately 100% can be maintained irrespective of an increase in incident angle only in a limited narrow wavelength range in the vicinity of a wavelength of 540 nm shifted from the center wavelength. Meanwhile, when the incident angle is fixed, a high diffraction efficiency of about 95% or more can be achieved in the 100-nm wavelength range around the center wavelength as shown in FIG. 15 (in the example in FIG. 15, a wavelength range of 450 to 550 nm).

According to the present embodiment, a 1st-order diffraction efficiency of approximately 100% can be maintained at a center wavelength of 550 nm even when the incident angle is changed in the above-described example. Therefore, it is assumed from the example in FIG. 15 that in the present embodiment, a high diffraction efficiency of about 95% or more can be achieved in a 100-nm wavelength range around a center wavelength of 550 nm (a wavelength range of 500 to 600 nm) with respect to the respective incident angles. Therefore, in the present embodiment, a high diffraction efficiency can be maintained over a wider wavelength range even when the incident angle is changed, as compared with the example in FIGS. 17A to 17D.

It should be noted here that a lens having a diffraction grating pattern essentially is characterized by its ability to reduce field curvature. Thus, it becomes possible to obtain a wide-angle image with a smaller blurring amount from the center to the periphery when the image is captured by a planar solid-state imaging device. However, when a conventional diffractive lens is used for imaging, this effect is obtained only in a limited narrow wavelength range as described above, and the excellent characteristic of the diffractive lens is not exploited. This is because when a use wavelength width is increased, an image has a lower contrast due to generation of unnecessary diffracted light, so that the image without blurring on its periphery is degraded.

On the other hand, when the wavelength width is decreased, an image has a higher contrast, but becomes less bright, resulting in a grainy image due to noise.

The diffractive imaging lens of the present embodiment can maintain a high diffraction efficiency with respect to a large wavelength width, and suppress generation of unnecessary diffracted light also with respect to a light beam incident at a large half angle of view. Therefore, it is possible to maximize the effect of a diffractive lens of reducing field curvature.

The imaging apparatus of the present invention as shown in FIG. 2 uses the diffractive imaging lens of the present embodiment, thereby obtaining a wide-angle and high-resolution image with the single lens. Since the apparatus does not use a lens system composed of a plurality of combined lenses, it can be thinned and downsized. Further, there is no need for a process for adjusting and deciding positions of lenses, and thus the number of lenses can be reduced, resulting in excellent productivity and economical efficiency. Consequently, the present embodiment is particularly suitable for imaging mobile phone cameras, in-vehicle cameras, surveillance cameras, or cameras for medical use.

In the present embodiment, the description has been directed to the case where the maximum ring number k with respect to which the radius ri is not larger than R is 10 and where the amounts of the steps corresponding to the ring numbers 1 to 10 are constant, by way of example. On the other hand, in the case where k=1 or r1>R is satisfied, the range in which the step amounts are constant is not provided, but the amounts of the steps corresponding to the ring numbers 1 to 29 decrease with increasing number.

In the diffractive imaging lens of the present embodiment, the first surface is aspherical. However, the first surface also may be provided with a diffraction grating pattern. In the case of using a conventional diffraction grating pattern with uniform steps, it is desirable that fewer diffraction grating steps are provided on the first surface side so as to suppress the generation of unnecessary diffracted light as much as possible. On the other hand, when the diaphragm is positioned away from the first surface toward the subject side, light beams pass through a peripheral portion of the first surface only at large half angles of view. Because of this, the diffraction grating pattern may have the same distribution of the steps as in the present embodiment, so as to suppress generation of unnecessary diffracted light.

The diffractive imaging lens according to the present embodiment is shown as an example. The shape of the lens, the material of the lens, and the size of the diaphragm may be changed as appropriate according to need. The same applies to the use wavelengths. Although the description has been given of the exemplary case where the use wavelengths are 500 to 600 nm, they are not limited thereto. When visible light, near-infrared light, or infrared light is used for imaging, the shape of the lens may be changed as appropriate in accordance with its wavelength. Further, an antireflection coating may be provided on a surface of the lens.

In the present embodiment, the amount of each of the diffraction ring steps of the second surface is calculated by using the correction coefficient β obtained by Formula (3). As described above, the step amounts are made smaller in a portion where a higher proportion of light beams are incident at large incident angles θ, thereby suppressing degradation of the 1st-order diffraction efficiency. When the correction coefficient β decreases with an increasing proportion of light incident at a larger incident angle θ, the step amount is reduced accordingly. Formula (3) is given as an example of obtaining the correction coefficient β as described above.

Thus, the correction coefficient β is not limited to what is set according to Formula (3). For example, Formula (3') below may be used instead of Formula (3).

$$\beta = (\cos \theta_{min} + \cos \theta_{max})/2 \qquad \text{Formulae (3')}$$

In Formulae (3) and (3'), only the minimum incident angle θmin and the maximum incident angle θmax are used for calculation. However, in accordance with the shape of the lens, an intermediate incident angle also may be provided as appropriate so as to assign different weights.

Namely, both formulae are available as long as the diffraction grating pattern has a configuration in which the step amounts are constant in the vicinity of the optical axis and decrease with distance from the optical axis in a region outside thereof, or a configuration in which the step amounts decrease with distance from the optical axis over an entire region from the vicinity of the optical axis to the outer periphery. Here, the shape between the respective steps may be modified so that the steps are connected smoothly.

Embodiment 2

Figure 4:
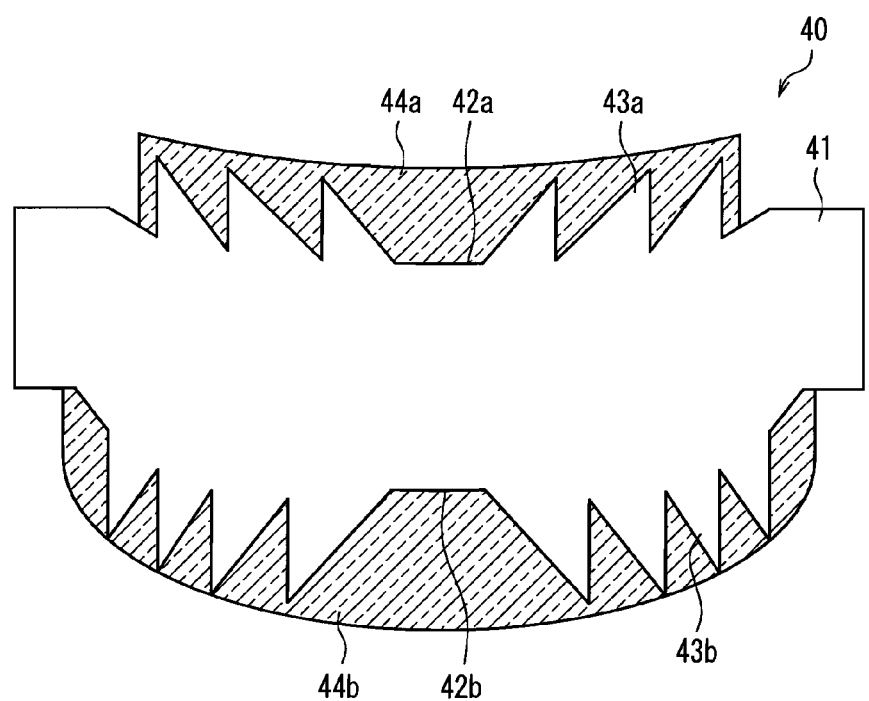
FIG. 4 is a cross-sectional view of a diffractive imaging lens according to Embodiment 2 of the present invention.

Hereinafter, a diffractive imaging lens according to Embodiment 2 of the present invention will be described. Descriptions will be omitted as to duplication of Embodiment 1 as described above. FIG. 4 is a cross-sectional view of the diffractive imaging lens according to the present embodiment. A diffractive imaging lens 40 is a single lens.

On a first surface 42a of a substrate 41, a ring-shaped diffraction grating pattern 43a is formed on an aspherical surface. Further, a protective film 44a is provided so as to cover the diffraction grating pattern 43a. On a second surface 42b opposed to the first surface 42a, a ring-shaped diffraction grating pattern 43b is formed on an aspherical surface. Further, a protective film 44b is provided so as to cover the diffraction grating pattern 43b. The protective films 44a and 44b are applied so that the underlying aspherical shapes are reflected on their surfaces. In the figure, steps of the diffraction grating patterns and the shape of the lens are shown schematically in favor of visibility.

The substrate 41 is made of polycarbonate (with a d-line refractive index of 1.585 and an Abbe number of 28). The protective films 44a and 44b are made of a resin (with a d-line refractive index of 1.623 and an Abbe number of 40) obtained by dispersing zirconium oxide having a particle diameter of 10 nm or less in an acrylic ultraviolet curable resin. The lens has a thickness of 1.3 mm on an optical axis.

Table 4 below shows aspherical coefficients and phase coefficients of the first surface 42a and the second surface 42b of the diffractive imaging lens 40 according to the present embodiment.

TABLE 4

| First surface | | Second surface | |
|---|---|---|---|
| Aspherical coefficient | Phase coefficient | Aspherical coefficient | Phase coefficient |
| Radius of curvature r (mm) | −36.73 | 1st-order  0 | Radius of curvature r (mm) | −1.06 | 1st-order  0 |
| | | 2nd-order  $2.08 \times 10^{-2}$ | | | 2nd-order  0 |
| | | 3rd-order  0 | | | 3rd-order  0 |
| Conic constant k | −4620 | 4th-order  $-9.04 \times 10^{-6}$ | Conic constant k | −1 | 4th-order  $4.17 \times 10^{-2}$ |
| | | 5th-order  0 | | | 5th-order  0 |
| 4th-order | −0.19 | 6th-order  $7.85 \times 10^{-9}$ | 4th-order | 0.07 | 6th-order  0 |
| 6th-order | −0.14 | 7th-order  0 | 6th-order | −0.02 | 7th-order  0 |
| 8th-order | 0.34 | 8th-order  $-8.52 \times 10^{-12}$ | 8th-order | −0.01 | 8th-order  $-7.23 \times 10^{-5}$ |
| 10th-order | 0 | 9th-order  0 | 10th-order | 0 | 9th-order  0 |
| 12th-order | 0 | 10th-order  $1.04 \times 10^{-14}$ | 12th-order | 0 | 10th-order  0 |
| | | 11th-order  0 | | | 11th-order  0 |
| | | 12th-order  $-1.35 \times 10^{-17}$ | | | 12th-order  $2.51 \times 10^{-7}$ |

The diffraction grating patterns on both the first surface 42a and the second surface 42b of the diffractive imaging lens 40 according to the present embodiment are formed so that an appropriate image can be formed by using 1st-order diffracted light.

Figure 5:
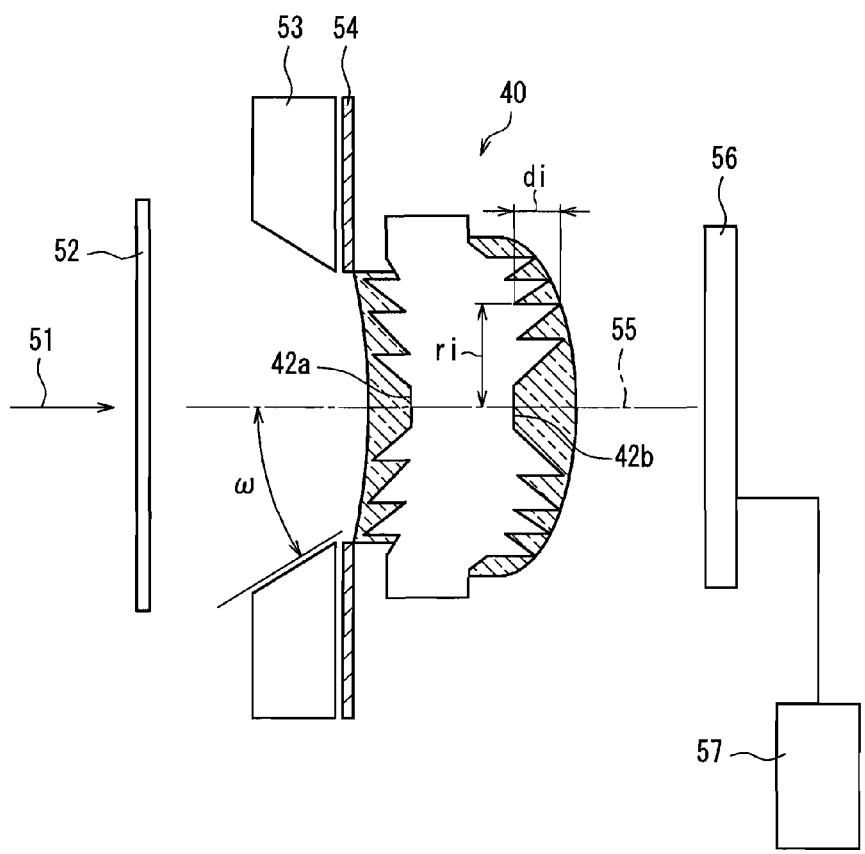
FIG. 5 is a view showing a configuration of an imaging apparatus according to Embodiment 2 of the present invention.

FIG. 5 shows an imaging apparatus using the diffractive imaging lens 40 according to the present embodiment. In the configuration shown in FIG. 5, the diffractive imaging lens 40 is used as a component of a diffractive imaging lens optical system. More specifically, the diffractive imaging lens 40 as well as a near-infrared cutoff filter 52, a hood 53, and a diaphragm 54 configure the diffractive imaging lens optical system.

Among light 51 from a subject (not shown), visible light in an entire wavelength range of 400 to 700 nm travels through the near-infrared cutoff filter 52, enters the hood 53, and reaches the diaphragm 54. The hood 53 is designed so as to prevent light from entering the optical system at a half angle of view ω (angle that the light forms with an optical axis 55) or larger. In the example in FIG. 5, ω is 30°

The diaphragm 54 is provided so that the optical axis 55 passes through its center. Light that has traveled through the diaphragm 54 passes through the first surface 42a and the second surface 42b of the lens to be incident on a solid-state imaging device 56. On respective pixels of the solid-state imaging device 56, color filters of RGB (not shown) are provided, from which color information is obtained. The information detected by the solid-state imaging device 56 is processed by an arithmetic circuit 57. After the processing, a color image of the subject is displayed by an appropriate display means connected to the arithmetic circuit 57. The diaphragm 54 has a diameter of 0.43 mm, a focal length of 1.75 mm, and an F number of 4.06.

Figure 6:
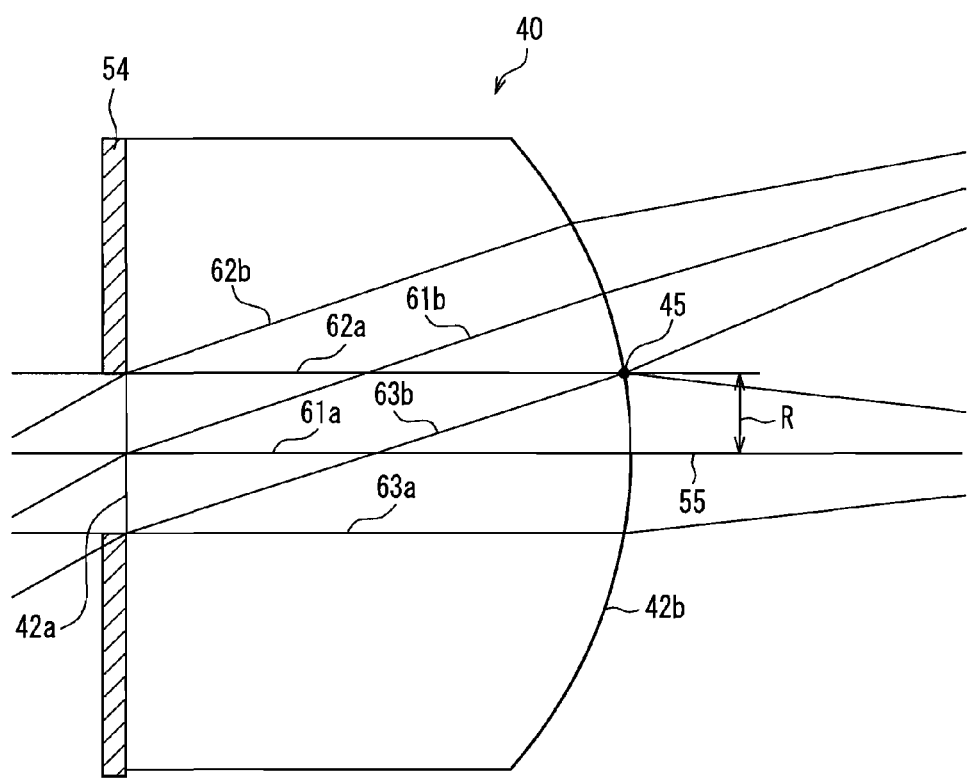
FIG. 6 is a view showing paths of light beams in the respective cases where a half angle of view is 0° and 30° in a diffractive imaging lens optical system according to Embodiment 2 of the present invention.

FIG. 6 shows paths of light beams having a wavelength of 550 nm from the subject that travel through the diaphragm 54 to be incident on the lens at half angles of view of 0° and 30°, respectively.

The light beams from the subject that travel through the diaphragm 54 to be incident on the lens in parallel with the optical axis 55 (at a half angle of view ω of 0°) have a principal ray 61a. In the case where ω is 0°, a light beam passing through an upper end of the diaphragm 54 is a light beam 62a, and a light beam passing through a lower end of the diaphragm 54 is a light beam 63a. Similarly, the light beams that are incident on the lens at an angle of 30° with respect to the optical axis 55 (at a half angle of view ω of 30°) have a principal ray 61b. In the case where ω is 30°, a light beam passing through the upper end of the diaphragm 54 is a light beam 62b, and a light beam passing through the lower end of the diaphragm 54 is a light beam 63b.

In FIG. 6, the diffraction grating patterns on the first surface 42a and the second surface 42b are not shown. The principal ray refers to a light beam that passes through the center of the diaphragm to be incident on the optical system. The principal ray is determined uniquely when the half angle of view ω is specified.

As can be seen from FIG. 6, the light beams pass through the entire first surface 42a at any half angles of view ω within a range of 0° to 30°. This is because the diaphragm 54 is close to the first surface 42a. On the other hand, the light beams pass through the second surface 42b only at large half angles of view ω in a portion far from the optical axis 55, and the light beams pass at small half angles of view ω of approximately 0° in a portion close to the optical axis 55.

Further, the diffraction grating patterns formed on the first surface 42a and the second surface 42b each have a distribution of a phase amount symmetrically with respect to and in parallel with the optical axis 55. Thus, the angles of incidence on the diffraction grating patterns on the first surface 42a and the second surface 42b are an angle formed between the light beam incident on the first surface 42a and the optical axis 55, and an angle formed between the light beam incident on the second surface 42b and the optical axis 55, respectively.

Even the light beams incident on the second surface 42b at the same half angle of view ω are incident on the diffraction grating pattern at different angles because they are refracted by the first surface 42a at different angles depending on where the light passes through the diaphragm 54.

As shown in FIG. 4, according to the diffractive imaging lens 40 of the present embodiment, the diffraction grating patterns are formed on the aspherical surfaces of both the first surface 42a and the second surface 42b, and the protective films are provided so as to cover the diffraction grating patterns. The following description is directed to characteristics of this configuration.

Figure 7:
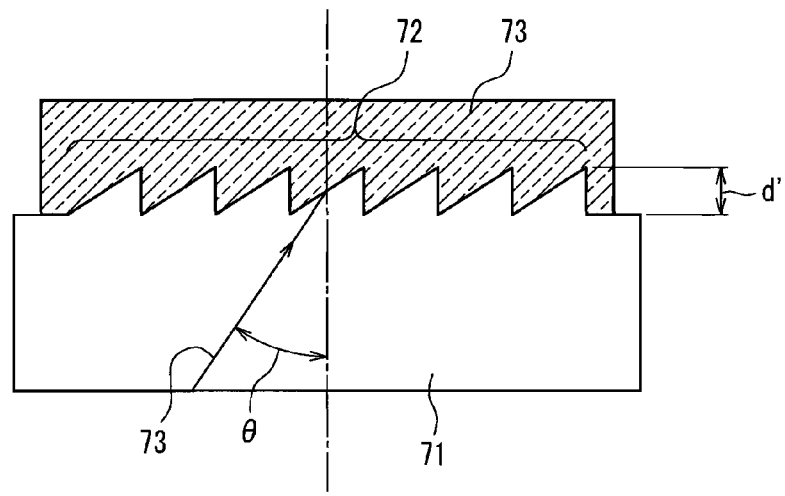
FIG. 7 is a view showing a configuration of a diffraction grating pattern covered with a protective film.

FIG. 7 shows a diffraction grating pattern covered with a protective film. A diffraction grating pattern 72 is formed on a substrate 71. A protective film 73 is applied and bonded to the diffraction grating pattern 72. A depth d' of the diffraction grating pattern such that a 1st-order diffraction efficiency with respect to a light beam incident on the diffraction grating pattern 72 vertically is 100% is given as the following formula.

$$d'=m\lambda/|n1(\lambda)-n2(\lambda)| \quad \text{Formula (4)}$$

where λ is a wavelength, m is a diffraction order, n1(λ) is a refractive index of a material of the substrate 71, and n2(λ) is a refractive index of a material of the protective film 73. When the value of the right-hand side of Formula (4) becomes constant in a certain wavelength band, this means that there is no wavelength dependence of an m-th-order diffraction efficiency in the foregoing wavelength band.

To obtain this effect, the substrate 71 and the protective film 73 should be formed with a combination of a material having a high refractive index and low dispersion and a material having a low refractive index and high dispersion. When appropriate materials satisfying this condition are used for the substrate 71 and the protective film 73, a diffraction efficiency of 95% or more can be achieved with respect to vertically incident light in an entire visible light range.

In this configuration, the material for the substrate 71 may be replaced with the material for the protective film 73. The depth d' of the diffraction grating pattern 72 becomes greater than the depth d of the diffraction grating pattern without a protective film as shown by Formula (2) above. Although the following description is directed to the case of a 1st-order diffraction efficiency where m is 1, m is not limited to 1.

As described above, in the diffractive imaging lens according to the present embodiment, the substrate is made of polycarbonate, and the protective film is made of a material obtained by dispersing fine particles of zirconium oxide in an ultraviolet curable resin.

Figure 8:
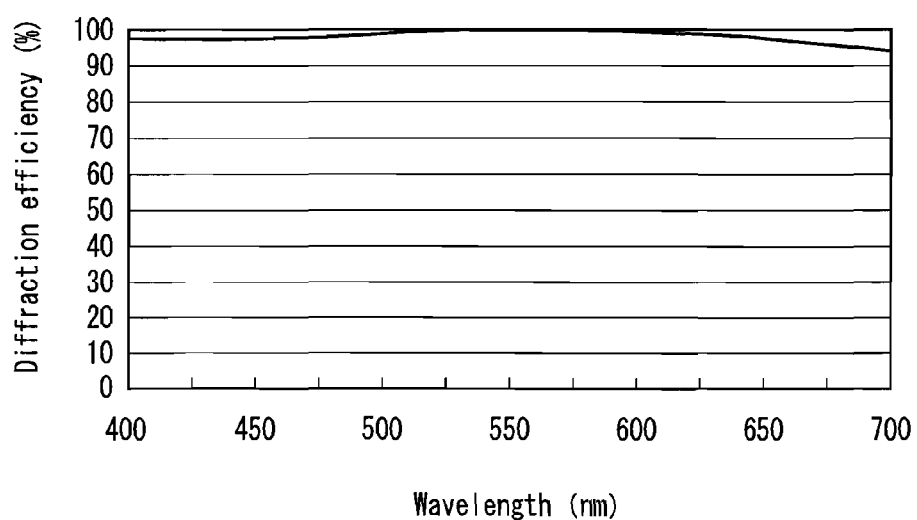
FIG. 8 is a diagram showing wavelength dependence of a 1st-order diffraction efficiency in the configuration shown in FIG. 7.
Figure 9A:
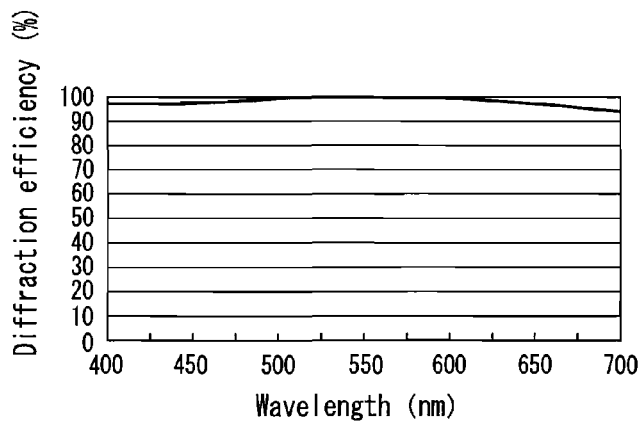
FIGS. 9A to 9D are diagrams showing wavelength dependence of a 1st-order diffraction efficiency in the configuration shown in FIG. 7 with an incident angle being a parameter.
Figure 9B:
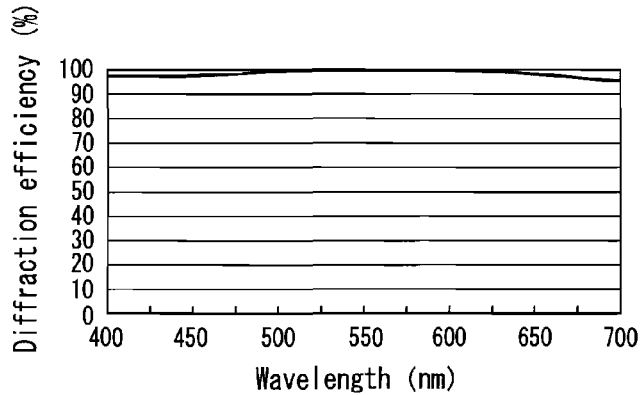
Figure 9C:
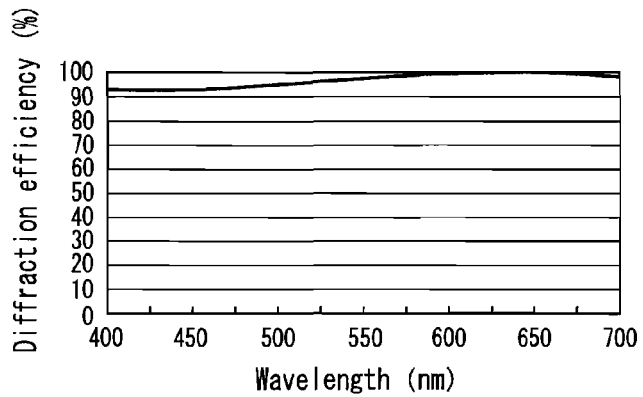
Figure 9D:
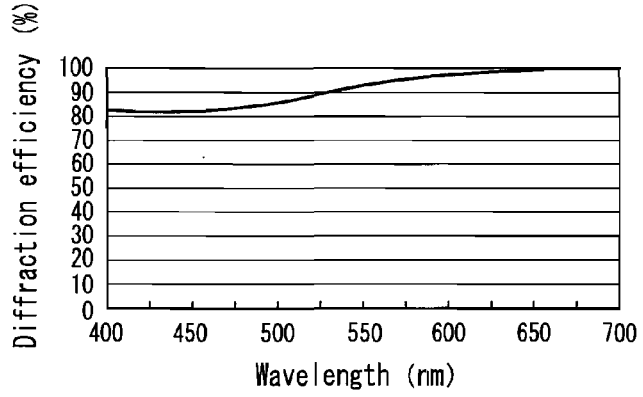

FIG. 8 shows wavelength dependence of a 1st-order diffraction efficiency with respect to a light beam that is incident vertically on a diffraction grating in a blazed form formed with a combination of the materials as described above. The step d' is 14.9 μm. As can be seen from FIG. 8, the 1st-order diffraction efficiency is 95% or more in an entire visible light wavelength range of 400 to 700 nm.

In FIG. 7, an incident angle θ indicates an angle at which a light beam is incident on the diffraction grating pattern 72. FIGS. 9A to 9D show wavelength dependence of a 1st-order diffraction efficiency in the diffraction grating in FIG. 7 with the incident angle θ being a parameter. FIGS. 9A, 9B, 9C, and 9D show wavelength dependence of a 1st-order diffraction efficiency in the cases where light is incident vertically, where θ is 10°, where θ is 20°, and where θ is 30°, respectively.

FIG. 7 shows a light beam incident on the diffraction grating pattern 72 from the substrate 71 side. On the contrary, with respect to a light beam incident from the protective film 73 side, an angle (corresponding to the incident angle θ in FIG. 7) formed with respect to the light beam becomes smaller than a half angle of view due to refraction. For example, this angle is about 18° when the half angle of view is 30°.

As can be seen from FIGS. 9A to 9D, degradation of the diffraction efficiency is suppressed over an entire visible light wavelength range of 400 to 700 nm with respect to all the incident angles as compared with FIGS. 17A to 17D as described above. However, as the angle of the light beam becomes larger, the wavelength dependence of the 1st-order diffraction efficiency is changed accordingly, resulting in degradation of the 1st-order diffraction efficiency in a part of the wavelength range. In such a case, unnecessary diffracted light is generated, which leads to a decrease in color reproducibility and contrast of an image.

In view of the above-described problem, the diffractive imaging lens according to the present embodiment has the following configuration. Table 5 below shows exemplary numerical values of the diffractive imaging lens of the present embodiment.

TABLE 5

| Ring number | | Radius (mm) ri of concentric circle | Minimum incident angle θ min (DEG) | Half angle of view ω (DEG) of minimum incident light beam | Maximum incident angle θ max (DEG) | Half angle of view ω (DEG) of maximum incident light beam |
|---|---|---|---|---|---|---|
| 1 | r1 | 0.339 | 6 | 10 | 18 | 30 |
| 2 | r2 | 0.403 | 9 | 14 | 18 | 30 |
| 3 | r3 | 0.446 | 11 | 17 | 18 | 30 |
| 4 | r4 | 0.479 | 12 | 20 | 18 | 30 |
| 5 | r5 | 0.507 | 14 | 23 | 18 | 30 |

TABLE 5-continued

| Ring number | | Radius (mm) ri of concentric circle | Minimum incident angle θ min (DEG) | Half angle of view ω (DEG) of minimum incident light beam | Maximum incident angle θ max (DEG) | Half angle of view ω (DEG) of maximum incident light beam |
|---|---|---|---|---|---|---|
| 6 | r6 | 0.531 | 15 | 25 | 18 | 30 |
| 7 | r7 | 0.551 | 16 | 26 | 18 | 30 |
| 8 | r8 | 0.570 | 17 | 28 | 18 | 30 |
| 9 | r9 | 0.587 | 18 | 30 | 18 | 30 |

In Table 5, the ring numbers refer to numbers assigned from the optical axis 55 side sequentially to steps of concentric diffraction rings on the second surface 42b of the diffractive imaging lens 40. Further, ri (i is an integer of 1 or more) represents a radius of the ring step corresponding to each of the ring numbers. In other words, ri represents a radius of the i-th diffraction ring step from the optical axis 55 side. Furthermore, θmin represents a minimum incident angle of a group of light beams passing through each of the ring steps, and θmax represents a maximum incident angle of the group of light beams passing through each of the ring steps. Table 5 also shows half angles of view of the light beams corresponding to θmin and θmax, respectively. There are 9 diffraction ring steps, which are coarser in the vicinity of the center of the lens surface, i.e., the optical axis, and become finer toward the periphery.

In FIG. 6, it is assumed that R is a distance between the optical axis 55 and a point 45 where the light beam incident on the diffractive imaging lens 40 in parallel with and farthest from the optical axis 55 crosses the diffraction grating pattern. More specifically, the light beam crossing at the point 45 is a light beam that has been incident on the first surface 42a at a half angle of view of 0° and passed through the upper end of the diaphragm 54. In the example shown in Table 5, R is 0.214 mm.

As shown in Table 5, since r1 (0.339 mm)>R (0.214 mm) is satisfied, the light beam incident at a half angle of view of 0° crosses none of the rings. As the ring number becomes larger, i.e., a distance from the optical axis 55 becomes larger, the light passes only at a larger half angle of view.

As described in Embodiment 1, when considering a planar subject that is vertical to the optical axis and has uniform brightness, an amount of luminous flux incident on an entrance pupil of the lens is proportional to the fourth power of cos ω with respect to the half angle of view ω. Namely, the light beams incident at larger half angles of view contribute less to an image. As the ring number becomes larger, the light beam is incident on the step at a larger half angle of view. On this account, it is ensured that amounts of the steps (depths of the diffraction grating pattern) decrease with distance from the optical axis. The step amounts are set in this manner for the same reason as described in Embodiment 1.

Table 6 below shows exemplary numerical values of the amounts (depths) of the diffraction ring steps in the diffractive imaging lens shown in Table 5.

TABLE 6

| Ring number | | Radius (mm) ri of concentric circle | Minimum incident angle θ min (DEG) | Maximum incident angle θ max (DEG) | Correction coefficient β | | Step amount (μm) di |
|---|---|---|---|---|---|---|---|
| 1 | r1 | 0.339 | 6 | 18 | 0.979 | d1 | 14.586 |
| 2 | r2 | 0.403 | 9 | 18 | 0.975 | d2 | 14.521 |
| 3 | r3 | 0.446 | 11 | 18 | 0.971 | d3 | 14.463 |
| 4 | r4 | 0.479 | 12 | 18 | 0.968 | d4 | 14.430 |
| 5 | r5 | 0.507 | 14 | 18 | 0.963 | d5 | 14.355 |
| 6 | r6 | 0.531 | 15 | 18 | 0.961 | d6 | 14.313 |
| 7 | r7 | 0.551 | 16 | 18 | 0.958 | d7 | 14.268 |
| 8 | r8 | 0.570 | 17 | 18 | 0.954 | d8 | 14.221 |
| 9 | r9 | 0.587 | 18 | 18 | 0.951 | d9 | 14.171 |

The step amount di (i is an integer of 1 or more) in Table 6 is an amount of the step corresponding to a position of the radius ri. In other words, di represents an amount of the step at a position of the i-th radius ri from the optical axis 55 side. FIG. 5 shows the relationship between the radius ri and the step amount di.

The step amounts d1 to d9 are obtained by multiplying d' obtained by Formula (4) above by a correction coefficient β. The correction coefficient β is obtained by Formula (5) below, considering that $(\cos 0°)^4$ is 1 and $(\cos 30°)^4$ is 0.56.

$$\beta = (\cos \theta min + 0.56 \cos \theta max)/1.56 \quad \text{Formula (5)}$$

Further, d' is calculated according to Formula (4) where λ is 550 nm, which is a center wavelength of a use wavelength band of 400 to 700 nm, the refractive index n1(λ) of the lens substrate is 1.589, the refractive index n2(λ) of the protective film is 1.626, and the diffraction order m is 1. At this time, d' is 14.9 μm.

The correction coefficient β can be obtained by substituting the minimum incident angle θmin and the maximum incident angle θmax corresponding to each of the ring numbers into Formula (5). The diffraction ring steps d1 to d9 are calculated by multiplying d' by the correction coefficients corresponding to the respective ring numbers.

Further, the diffraction grating pattern is designed so that the steps are connected smoothly in accordance with the correction coefficients β. In this manner, the shape of the second surface 42b in the diffractive imaging lens 40 of the present embodiment is determined.

Similarly to Embodiment 1, the numerical values in Table 6 may be changed as appropriate to the extent that the step amounts can be regarded as decreasing with increasing number.

On the other hand, even when the light beam is incident on the first surface 42a at a large half angle of view, it is incident on the diffraction grating pattern 43a at an angle smaller than the half angle of view because it is refracted by the protective film 44a. For example, the light beam incident at a half angle of view of 30° is refracted by the protective film 44a to be incident on the diffraction grating pattern 43a forming an angle of as small as about 18° with respect to the optical axis.

Further, even when the diffraction grating pattern has only two diffraction rings with the same steps, unnecessary diffracted light can be reduced. According to the diffractive imaging lens of the present embodiment, the two steps are both 14.9 μm.

In the diffractive imaging lens of the present embodiment, the amounts of the steps of the diffraction grating pattern on the second surface 42b have a distribution as shown in Table 6. Therefore, it is possible to achieve a 1st-order diffraction efficiency of approximately 100% with respect to all light beams incident at a small half angle of view to a large half angle of view of 30°. Consequently, it is possible to realize a wide-angle and high-resolution diffractive imaging lens that can reduce unnecessary diffracted light. Further, since the diffractive imaging lens of the present embodiment produces little unnecessary diffracted light, aberration of field curvature of the diffractive lens can be reduced as much as possible.

These effects are the same as those in Embodiment 1 as described above. However, according to the present embodiment, in addition to the configuration in Embodiment 1, the protective films are provided so as to cover the diffraction grating patterns, thereby suppressing the wavelength dependence of the diffraction efficiency. Consequently, in the present embodiment, a high diffraction efficiency can be maintained over a still wider wavelength range as compared with Embodiment 1.

The imaging apparatus of the present invention as shown in FIG. 5 uses the diffractive imaging lens 40 of the present embodiment, thereby obtaining a high-resolution and wide-angle image with the single lens, which is also the same as in Embodiment 1. Namely, since the apparatus does not use a lens system composed of a plurality of combined lenses, it can be thinned and downsized. Further, there is no need for a process for adjusting and deciding positions of lenses, and thus the number of lenses can be reduced, resulting in excellent productivity and economical efficiency. Consequently, the present embodiment is particularly suitable for imaging mobile phone cameras, in-vehicle cameras, surveillance cameras, or cameras for medical use.

Figure 10:
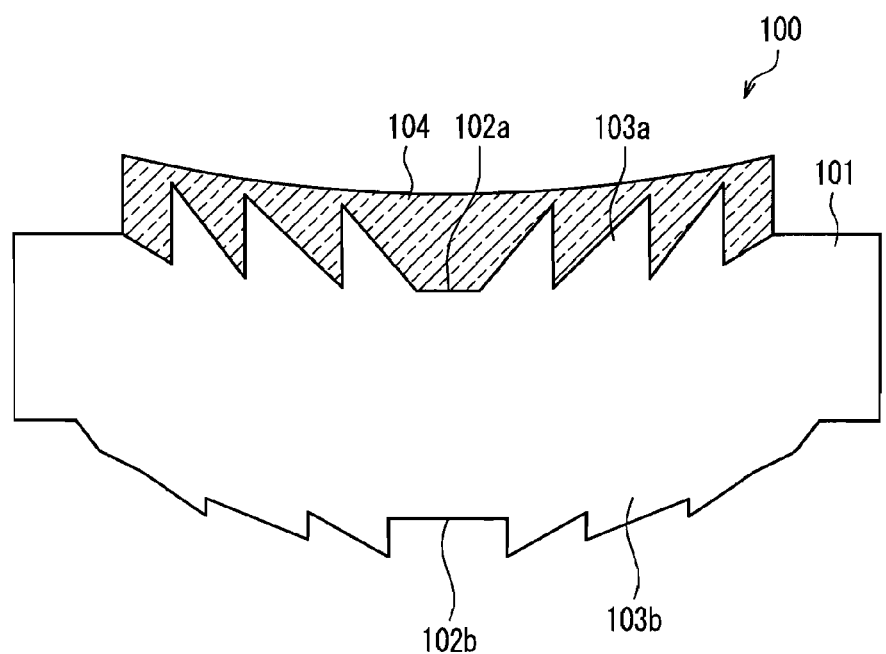
FIG. 10 is a cross-sectional view of a diffractive imaging lens according to a second example of the embodiment of the present invention.

Next, FIG. 10 is a cross-sectional view of a diffractive imaging lens according to a second example of the present embodiment. A diffractive imaging lens 100 is intended for use with respect to a wavelength width not more than 100 nm, e.g., wavelengths of 600 to 700 nm.

On a first surface 102a of a substrate 101, a diffraction grating pattern 103a covered with a protective film 104 is provided. A second surface 102b has the same configuration as that in Embodiment 1. Namely, no protective film is provided, and step amounts of a diffraction grating pattern 103b become smaller toward the periphery. Steps of the diffraction grating pattern 103a on the first surface may be uniform or nonuniform.

In the configuration shown in FIG. 10, a light beam incident at a half angle of view of 30° is refracted by the protective film 104 to be incident on the diffraction grating pattern 103a forming an angle of as small as about 18° with respect to an optical axis.

As can be seen from FIGS. 9A to 9D, degradation of the 1st-order diffraction efficiency is suppressed in a wavelength range of 600 to 700 nm with respect to all the incident angles. Among them, in the case of FIG. 9C where the incident angle is 20°, a particularly preferable result is shown. This means that the configuration as shown in FIG. 10 that is capable of reducing the incident angle of a light beam incident at a half angle of view of 30° to about 18° can prevent degradation of the 1st-order diffraction efficiency advantageously.

Further, a comparison of FIGS. 9A to 9D over the entire wavelength band shows that degradation of the 1st-order diffraction efficiency is suppressed when the incident angle is smaller. This also shows that the configuration in FIG. 10 that is capable of reducing the incident angle can prevent degradation of the 1st-order diffraction efficiency advantageously.

According to the present embodiment, the diffractive imaging lens 40 has a configuration in which the diffraction grating pattern 43b is covered with the protective film 44b as shown in FIG. 4. As described above, in order for d' that gives a maximum first-order diffraction efficiency to be constant without depending on the use wavelengths in Formula (4), it is required to form the substrate 41 having the diffraction grating pattern 43b and the protective film 44b with a combination of a material having a high refractive index and low dispersion and a material having a low refractive index and high dispersion.

As long as the above-described refractive index conditions are satisfied, the materials are not limited to those described above. In this case, it is desirable that both the substrate 41 and the protective film 44b are made of a material containing a resin as a principal component, and in particular, the substrate 41 is made of a thermoplastic resin having favorable productivity. Thus, it is desirable that a thermoplastic resin material is used for the substrate 41 as a material having a low refractive index and high dispersion, and a material obtained by dispersing inorganic particles in a resin is used for the protective film 44b as a material having a high refractive index and low dispersion as in the present embodiment.

Further, in the present embodiment, a material obtained by dispersing fine particles of zirconium oxide in an acrylic ultraviolet curable resin is used as a material for the protective film 44b as described above. The use of a photocurable resin such as an ultraviolet curable resin enables application and molding of a surface shape using a die, thereby facilitating the formation of the protective film.

Further, a colorless and transparent oxide material is desirable as inorganic particles to be dispersed. In particular, in order to realize a protective film having a high refractive index and low dispersion, an inorganic material having a high refractive index and low dispersion is required. Specifically, yttrium oxide and aluminum oxide are available as well as zirconium oxide as shown in the present embodiment. These oxides may be used alone or as a mixture.

The description has been given of the diffractive imaging lens 40 in which the first surface 42a is covered with the protective film 44a, by way of example. However, the first surface may be aspherical without the protective film 44a.

Further, the diffractive imaging lens according to the present embodiment is shown as an example. The shape of the lens, the material of the lens, and the size of the diaphragm may be changed as appropriate according to need. The same applies to the use wavelengths. Although the description has been given of the exemplary case where the use wavelengths are those of visible light, they are not limited thereto. When near-infrared light or infrared light is used for imaging, the shape of the lens may be changed as appropriate in accordance with its wavelength. Further, an antireflection coating may be provided on a surface of the lens.

In the example shown in Table 6, the step amounts d1 to d9 corresponding to the ring numbers 1 to 9 decrease with increasing number. However, in the case where there is a maximum ring number k with respect to which the radius ri is not larger than R, the step amounts corresponding to the ring numbers 1 to k may be constant as in Embodiment 1. Here, the constant step amounts may vary to the extent that they can be regarded as constant, as in Embodiment 1.

Further, the correction coefficient β is not limited to that obtained by Formula (5), as in Embodiment 1. In the present embodiment, the correction coefficient β obtained by Formula (5) is used for calculation of the amount of each of the diffraction ring steps on the second surface. However, Formula (3') above may be used instead of Formula (5).

In Formula (5), only the minimum incident angle θmin and the maximum incident angle θmax are used for calculation. However, in accordance with the shape of the lens, an intermediate incident angle also may be provided as appropriate so as to assign different weights, as in Embodiment 1.

Namely, as in Embodiment 1, both the formulae are available as long as the diffraction grating pattern has a configuration in which the step amounts are constant in the vicinity of the optical axis and decrease with distance from the optical axis in a region outside thereof, or a configuration in which the step amounts decrease with distance from the optical axis over an entire region from the vicinity of the optical axis to the outer periphery. Here, the shape between the respective steps may be modified so that the steps are connected smoothly.

Embodiment 3

Figure 11:
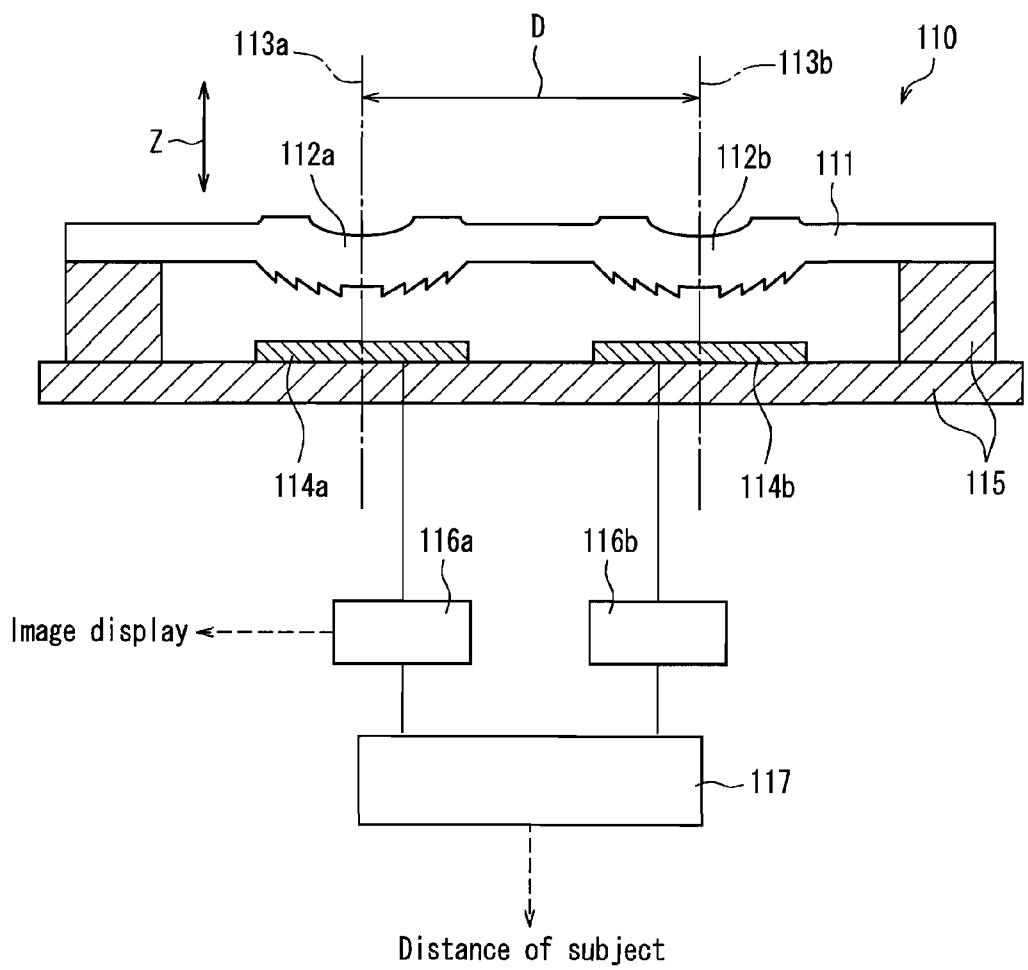
FIG. 11 is a view showing a configuration of an imaging apparatus according to Embodiment 3 of the present invention.

FIG. 11 is a cross-sectional view of an imaging apparatus according to an embodiment of the present invention, taken along an optical axis. An imaging apparatus 110 is a compound-eye type imaging apparatus having a plurality of units, each including a diffractive imaging lens optical system with a diffractive imaging lens and a solid-state imaging device. Two lenses 112a and 112b are integrated in a lens array 111. The two lenses 112a and 112b each are a double-sided aspherical single lens independent of each another, and include a diffraction grating pattern formed only on one side. Each of these lenses corresponds to the diffractive imaging lens according to Embodiment 1. Each of these diffractive imaging lenses is combined with a diaphragm (not shown), so that the diffractive imaging lens optical system is configured.

An optical axis 113a of the lens 112a and an optical axis 113b of the lens 112b are parallel to each other. As shown in FIG. 11, Z represents a direction parallel to the optical axes 113a and 113b. Two solid-state imaging devices 114a and 114b are arranged on a holder 115. Each of the solid-state imaging devices 114a and 114b performs monochrome sensing, and includes therein a color filter (not shown) that transmits light having wavelengths of 500 to 600 nm.

The optical axes 113a and 113b of the two lenses pass substantially through centers of the two solid-state imaging devices 114a and 114b (intersections of diagonal lines of the rectangular solid-state imaging devices), respectively. Therefore, a distance between the centers of the solid-state imaging devices 114a and 114b is substantially equal to a distance D between centers of the lenses 112a and 112b.

An image of light from a subject is formed by the lenses 112a and 112b, and only green light is incident on the respective solid-state imaging devices 114a and 114b so as to be converted into electric signals for each pixel. The electric signal information of the solid-state imaging devices 114a and 114b is processed by arithmetic circuits 116a and 116b, respectively, and an image is displayed by a display means based on a signal from either of the arithmetic circuits.

The compound-eye type imaging apparatus as described above enables not only image display but also measurement of a distance of the subject using a parallax generated between images of the lenses 112a and 112b. A parallax can be extracted by an image comparing and processing circuit 117 comparing and calculating the pixel information obtained by the arithmetic circuits 116a and 116b.

Figure 12:
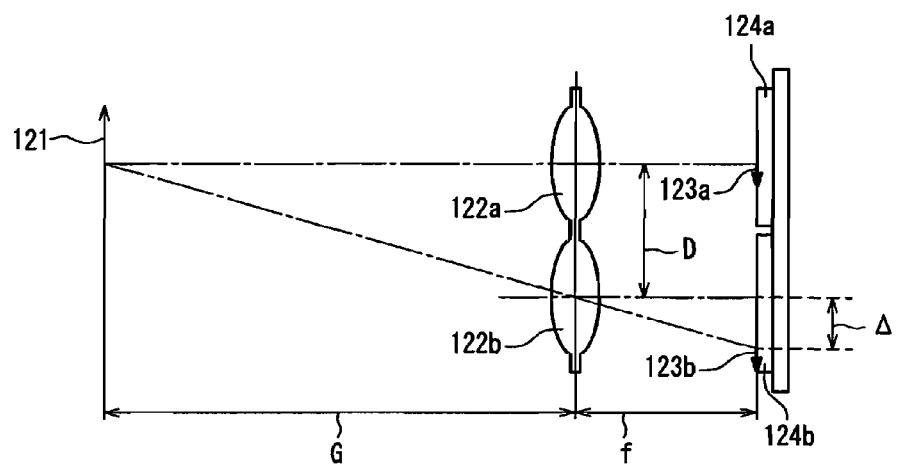
FIG. 12 is a view showing a principle of measuring a distance of a subject by using a parallax.
Figure 13:
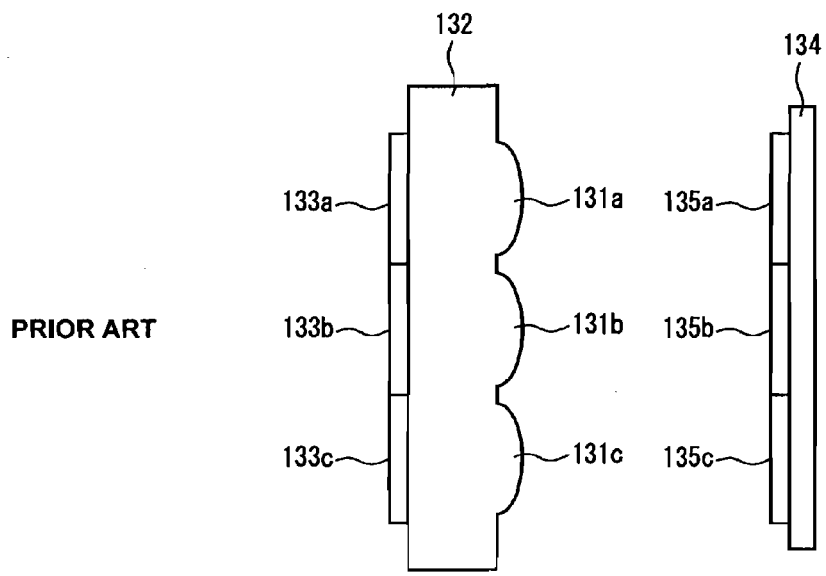
FIG. 13 is a view showing an exemplary configuration of a major portion of a conventional compound-eye type camera module.
Figure 14:
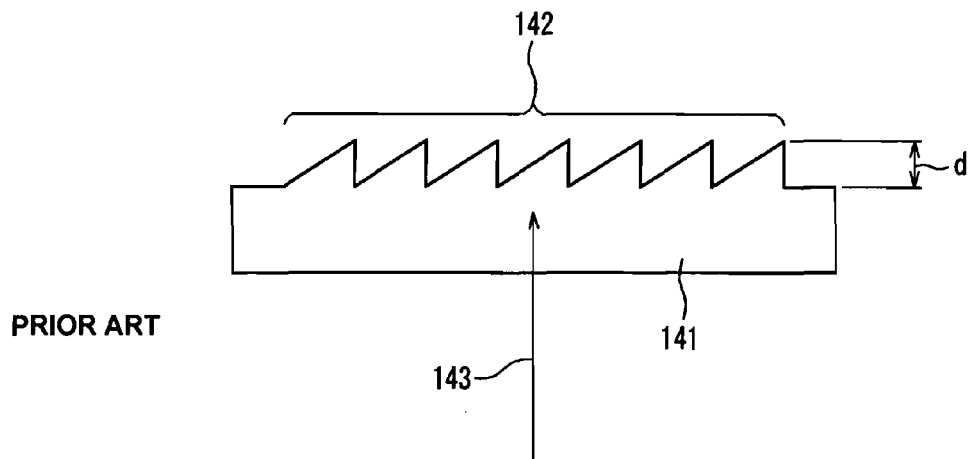
FIG. 14 is a view showing an exemplary conventional diffraction grating pattern.

FIG. 12 is a view showing a principle of measuring a distance of a subject by using a parallax. An image obtained by allowing light from a subject 121 to pass through a lens 122a is a subject image 123a, and an image obtained by allowing the light to pass through a lens 122b is a subject image 123b. The light reaches solid-state imaging devices 124a and 124b such that the same point on the subject is shifted by a parallax Δ, and is received by pixels on the solid-state imaging devices so as to be converted into electric signals.

Formula (6) below is satisfied, where D is a distance between an optical axis of the lens 122a and an optical axis of the lens 122b, G is a distance between the lenses 122a and 122b and the subject 121, f is a focal length of the lenses 122a and 122b, and G is sufficiently larger than f.

$$G = Df/\Delta \qquad \text{Formula (6)}$$

In Formula (6), the distance D and the focal length f are known. The parallax Δ can be extracted by the image comparing and processing circuit 117 comparing and calculating the pixel information obtained by the arithmetic circuits 116a and 116b, as described above.

For example, images obtained by the solid-state imaging devices 124a and 124b, respectively, are divided into a plurality of blocks. One block corresponding to the solid-state imaging device 124a is selected, and a closely resembling block corresponding to the solid-state imaging device 124b is extracted. Then, positions of these two blocks are compared, thereby calculating a parallax.

The distance G to the subject 121 can be calculated by substituting the known values D and f as well as the extracted value Δ into Formula (6). In this manner, the compound-eye type imaging apparatus has a function not only of obtaining an image but also as a distance-measuring sensor.

The imaging apparatus according to the present embodiment uses the diffractive imaging lens according to the present invention, thereby achieving the following effects. That is, due to a high resolution, the imaging apparatus can use a solid-state imaging device having a fine pixel pitch, which makes it possible to detect a parallax Δ with higher accuracy, and thus to measure the distance of the subject with increased accuracy. Further, since the imaging apparatus is capable of capturing a wide-angle image, the subject whose distance is to be measured may be positioned not only in the vicinity of the optical axis of the imaging apparatus but also in a wider range of angle of view. Since the lens is available for a larger wavelength width as compared with a conventional diffractive imaging lens, a bright image can be obtained. Usually, when the pixel pitch of the solid-state imaging device becomes smaller, the resultant image is darker. However, the present invention can compensate for this.

Further, the optical system is composed of the single lens rather than a plurality of combined lenses. Thus, in the case of achieving the same focal length f, the thickness of the imaging apparatus can be made relatively smaller. Further, the lens can be mounted simply.

Although the use wavelengths of the imaging apparatus of the present embodiment are 500 to 600 nm, they are not limited thereto. When visible light, near-infrared light, or infrared light is used for imaging, the shape of the lens may be changed as appropriate in accordance with its wavelength.

Further, the description has been given of the compound-eye type using two lenses, by way of example. However, a compound-eye type using three or more lenses is also available.

When the imaging apparatus uses the diffractive imaging lens of Embodiment 2, and includes RGB color filters in a Bayer arrangement or the like in the solid-state imaging device, the apparatus becomes capable of displaying a color image and measuring the distance of the subject.

In the present embodiment, the plurality of solid-state imaging devices are used. However, it is also possible to use one solid-state imaging device with its imaging region divided.

INDUSTRIAL APPLICABILITY

The present invention provides the wide-angle and high-resolution diffractive imaging lens and diffractive imaging lens optical system, which are useful in an imaging apparatus such as a camera. In particular, they are suitable as a lens and a lens optical system of a mobile phone camera, an in-vehicle camera, a surveillance camera, or a camera for medical use.

The invention claimed is:

1. A diffractive imaging lens comprising:
a substrate having a surface on which a diffraction grating pattern is provided,
wherein the diffraction grating pattern includes a plurality of blazed steps disposed concentrically with an optical axis,
the diffraction grating pattern including:
a first portion extending in a radial direction where heights of the blazed steps are substantially the same, and
a second portion extending in a radial direction where heights of the blazed steps decrease with an increase of distance from the optical axis, and
wherein the first portion is disposed closer to the optical axis than the second portion.

2. The diffractive imaging lens according to claim 1, wherein the diffraction grating pattern is covered with a protective film made of a material different from a material of the diffraction grating pattern.

3. The diffractive imaging lens according to claim 2, wherein the protective film is formed on a subject-side surface of the diffractive imaging lens.

4. The diffractive imaging lens according to claim 2, wherein the diffraction grating pattern and the protective film are made of a resin, and either the diffraction grating pattern or the protective film is made of a mixed material of a resin and inorganic particles.

5. The diffractive imaging lens according to claim 4, wherein the protective film is made of a material obtained by dispersing particles of any one or more of zirconium oxide, yttrium oxide, and aluminum oxide in a photocurable resin.

6. The diffractive imaging lens according to claim 1, wherein the first portion extends from the optical axis to a predetermined distance R and the second portion extends from the predetermined distance R to a periphery of the diffractive imaging lens.

7. The diffractive imaging lens according to claim 6, wherein the predetermined distance R is a distance from the optical axis to a point where a light beam incident on the diffractive imaging lens in parallel with and farthest from the optical axis crosses the surface of the diffractive imaging lens.

8. A diffractive imaging lens optical system comprising:
a diaphragm; and
a diffractive imaging lens that forms an image of a subject via the diaphragm,
wherein the diffractive imaging lens includes a substrate having a surface on which a diffraction grating pattern is provided,
the diffraction grating pattern includes a plurality of blazed steps disposed concentrically with an optical axis, and
assuming that ri (i is an integer of 1 or more) is an i-th radius from an optical axis side among radiuses of concentric circles corresponding to the respective blazed steps, di (i is an integer of 1 or more) is a height of a blazed step corresponding to ri, and R is a distance between the optical axis and a point where a light beam incident on the diffractive imaging lens in parallel with and farthest from the optical axis crosses the diffraction grating pattern,
when, among ri, rk is a maximum radius that is not larger than R,
in the case where k≧2 is satisfied, the heights d1 to dk of the blazed steps are substantially the same, and heights of the blazed steps provided at a greater distance from the optical axis than a blazed step corresponding to rk decrease with an increase of distance from the optical axis, and
in the case where k=1 or r1>R is satisfied, the heights of the blazed steps decrease with an increase of distance from the optical axis over the entire diffraction grating pattern.

9. The diffractive imaging lens optical system according to claim 8, wherein the diffraction grating pattern is covered with a protective film made of a material different from a material of the diffraction grating pattern.

10. The diffractive imaging lens optical system according to claim 9, wherein the protective film is formed on a subject-side surface of the diffractive imaging lens.

11. The diffractive imaging lens optical system according to claim 9, wherein the diffraction grating pattern and the protective film are made of a resin, and either the diffraction grating pattern or the protective film is made of a mixed material of a resin and inorganic particles.

12. The diffractive imaging lens optical system according to claim 11, wherein the protective film is made of a material obtained by dispersing particles of any one or more of zirconium oxide, yttrium oxide, and aluminum oxide in a photocurable resin.

13. An imaging apparatus comprising:
the diffractive imaging lens optical system according to claim 8;
a solid-state imaging device that receives light from a subject that has passed through the diffractive imaging lens optical system; and
an arithmetic circuit for generating an image of the subject based on an electric signal detected by the solid-state imaging device.

14. The imaging apparatus according to claim 13, further comprising an image comparing and processing circuit,
wherein a plurality of units, each including the optical system and the solid-state imaging device, are provided, and
the image comparing and processing circuit compares the electric signals detected by the solid-state imaging devices corresponding to the respective units, thereby calculating distance information of the subject.

15. A diffractive imaging lens comprising:
a substrate having a surface on which a diffraction grating pattern is provided,
wherein the diffraction grating pattern includes a plurality of blazed steps disposed concentrically with an optical axis, and
wherein the diffraction grating pattern is configured such that a height of the blazed steps decrease with an increase of distance from the optical axis over an entire portion of the diffraction grating pattern.

* * * * *